US010659217B2

(12) United States Patent
Ramasamy et al.

(10) Patent No.: US 10,659,217 B2
(45) Date of Patent: May 19, 2020

(54) BLOCKCHAIN-BASED AUTOMATED USER MATCHING

(71) Applicant: Bank of America Corporation, Charlotte, NC (US)

(72) Inventors: Suki Ramasamy, Chennai (IN); Sasidhar Purushothaman, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 303 days.

(21) Appl. No.: 15/862,727

(22) Filed: Jan. 5, 2018

(65) Prior Publication Data
US 2019/0215149 A1  Jul. 11, 2019

(51) Int. Cl.
*H04L 29/06* (2006.01)
*H04L 9/06* (2006.01)
*H04L 29/08* (2006.01)
*G06N 3/02* (2006.01)

(52) U.S. Cl.
CPC ............ *H04L 9/0618* (2013.01); *G06N 3/02* (2013.01); *H04L 67/104* (2013.01); *H04L 67/1012* (2013.01); *H04L 67/1036* (2013.01)

(58) Field of Classification Search
CPC ............... H04L 9/0618; H04L 67/1012; H04L 67/1036; H04L 67/104; G06N 3/02
See application file for complete search history.

(56) References Cited

U.S. PATENT DOCUMENTS

| | | |
|---|---|---|
| 9,298,806 B1 * | 3/2016 | Vessenes .............. G06Q 20/065 |
| 9,397,985 B1 | 7/2016 | Seger, II et al. |
| 9,667,427 B2 | 5/2017 | Oberhauser et al. |
| 9,722,790 B2 | 8/2017 | Ebrahimi |
| 9,743,272 B1 | 8/2017 | Ogrinz et al. |
| 9,749,140 B2 | 8/2017 | Oberhauser et al. |
| 9,749,297 B2 | 8/2017 | Gvili |
| 9,792,609 B2 | 10/2017 | Burke et al. |
| 9,792,648 B1 | 10/2017 | Haller et al. |
| 9,794,199 B2 | 10/2017 | Capper et al. |

(Continued)

OTHER PUBLICATIONS

Swan, Melanie, "Blockchain—Blueprint for a New Economy," O'Reilly Media, Inc., retrieved from <http://w2.blockchain-tec.net/blockchain/blockchain-by-melanie-swan.pdf>, Feb. 2015, 149 pages.

(Continued)

*Primary Examiner* — Hee K Song
(74) *Attorney, Agent, or Firm* — Banner & Witcoff, Ltd.; Michael A. Springs

(57) ABSTRACT

Methods, systems, and apparatuses for blockchain-based automated user matching are described herein. In some arrangements, a node within a decentralized peer-to-peer (e.g., P2P) network may receive match parameters from one or more computing devices associated with supply side entities and demand side entities. The node may execute one or more artificial intelligence algorithms to match the supply side entities with the demand side entities based on the received match parameters. In some instances, the artificial intelligence algorithms may be stored in a smart contract on a blockchain and the matching may be performed through execution of the smart contract by nodes of the decentralized P2P network.

20 Claims, 18 Drawing Sheets

(56) References Cited

U.S. PATENT DOCUMENTS

| | | |
|---|---|---|
| 9,794,414 B1 | 10/2017 | Kammeyer et al. |
| 9,794,797 B2 | 10/2017 | Hoffberg |
| 9,798,576 B2 | 10/2017 | Cismas et al. |
| 9,798,787 B1 | 10/2017 | Beard et al. |
| 9,798,954 B1 | 10/2017 | Liu et al. |
| 9,799,011 B2 | 10/2017 | Dunn et al. |
| 9,799,016 B2 | 10/2017 | Kurian |
| 9,799,084 B2 | 10/2017 | Forbes, Jr. |
| 9,800,829 B2 | 10/2017 | White |
| 9,805,014 B2 | 10/2017 | Ramakrishnan et al. |
| 9,805,338 B1 | 10/2017 | Ghosn |
| 9,805,344 B1 | 10/2017 | Bent, II et al. |
| 9,807,078 B2 | 10/2017 | Porzio et al. |
| 9,807,614 B2 | 10/2017 | Salonen |
| 9,811,820 B2 | 11/2017 | Pitroda et al. |
| 9,811,847 B2 | 11/2017 | Berger et al. |
| 9,811,868 B1 | 11/2017 | Rapoport et al. |
| 9,814,930 B2 | 11/2017 | Manzke et al. |
| 9,817,738 B2 | 11/2017 | Ramanujan et al. |
| 9,817,902 B2 | 11/2017 | Rezaei |
| 9,818,028 B2 | 11/2017 | Shigeeda et al. |
| 9,818,105 B1 | 11/2017 | Jung et al. |
| 9,818,116 B2 | 11/2017 | Caldera |
| 9,818,140 B2 | 11/2017 | Inghelbrecht et al. |
| 9,818,154 B1 | 11/2017 | Wilbert et al. |
| 9,818,156 B2 | 11/2017 | Quinton |
| 9,818,254 B2 | 11/2017 | Lutnick et al. |
| 9,819,561 B2 | 11/2017 | Freishtat et al. |
| 9,821,184 B1 | 11/2017 | Chapman et al. |
| 9,823,949 B2 | 11/2017 | Ristock et al. |
| 9,823,958 B2 | 11/2017 | Dryer et al. |
| 9,824,116 B2 | 11/2017 | Lee |
| 9,824,198 B2 | 11/2017 | Carroll et al. |
| 9,824,204 B2 | 11/2017 | Arms et al. |
| 9,824,288 B1 | 11/2017 | Hall et al. |
| 9,824,394 B1 | 11/2017 | Boates et al. |
| 9,825,877 B2 | 11/2017 | Mohindra et al. |
| 9,825,953 B2 | 11/2017 | Gibbons |
| 9,830,145 B2 | 11/2017 | Huang |
| 9,830,581 B2 | 11/2017 | Block et al. |
| 9,830,592 B2 | 11/2017 | Henry |
| 9,830,600 B2 | 11/2017 | Moskowitz |
| 9,830,656 B2 | 11/2017 | Pessin |
| 9,830,660 B2 | 11/2017 | Dintenfass et al. |
| 9,832,159 B1 | 11/2017 | Kursun et al. |
| 9,832,316 B1 | 11/2017 | Prasad et al. |
| 2016/0260171 A1 | 9/2016 | Ford et al. |
| 2016/0261404 A1 | 9/2016 | Ford et al. |
| 2016/0292680 A1 | 10/2016 | Wilson, Jr. et al. |
| 2017/0024813 A1 | 1/2017 | Crouspeyre et al. |
| 2017/0140375 A1 | 5/2017 | Kunstel |
| 2017/0178237 A1 | 6/2017 | Wong |
| 2017/0206532 A1 | 7/2017 | Choi |
| 2017/0236094 A1 | 8/2017 | Shah |

OTHER PUBLICATIONS

Chinaka, Malvern, "Blockchain technology—applications in improving financial inclusion in developing economies: Case study for small scale agriculture in Africa," Jun. 2016, retrieved from <https://dspace.mit.edu/bitstream/handle/1721.1/104542/958426765-MIT.pdf?sequence=1>, 52 pages.

Dhar, et al, "Can blockchain address non-performing loan-related issues int he Indian banking system?," Asian Management Insights, vol. 3, Smarter Banking—Industry Insights, retrieved from <http://www.emeraldgrouppublishing.com/learning/ami/vol3_iss_2/9.Smarter%20Banking.pdf>, pp. 46-52.

Lane, et al, "Lowering Financial Inclusion Barriers With a Blockchain-Based Capital Transfer System, " retrieved from <https://icobazaar.com/static/9a9f3991d80c1c313aa0b008708c7ac7/5963c09d077a520b5a965208_20170710_EVX_WP.pdf>, 27 pages.

Kshertri, Nir, "Potential roles of blockchain in fighting poverty and reducing financial exclusion in the global south," Journal of Global Information Technology Management, 20:4, 201-204, DOI: 10.1080/1097198X2017.1391370, retrieved from <http://www.tandfonline.com/doi/full/10.1080/1097198X.2017.1391370>, 5 pages.

* cited by examiner

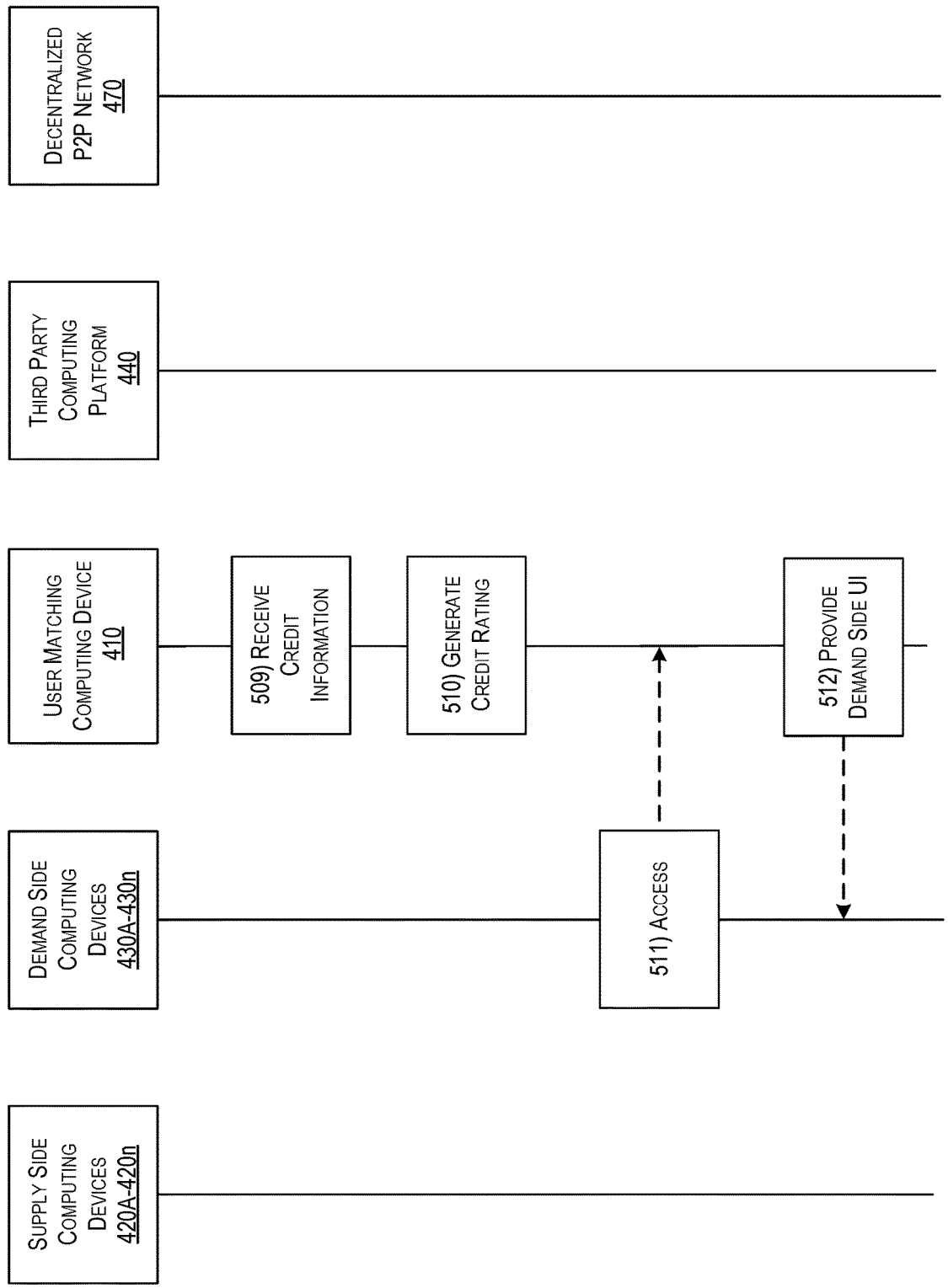

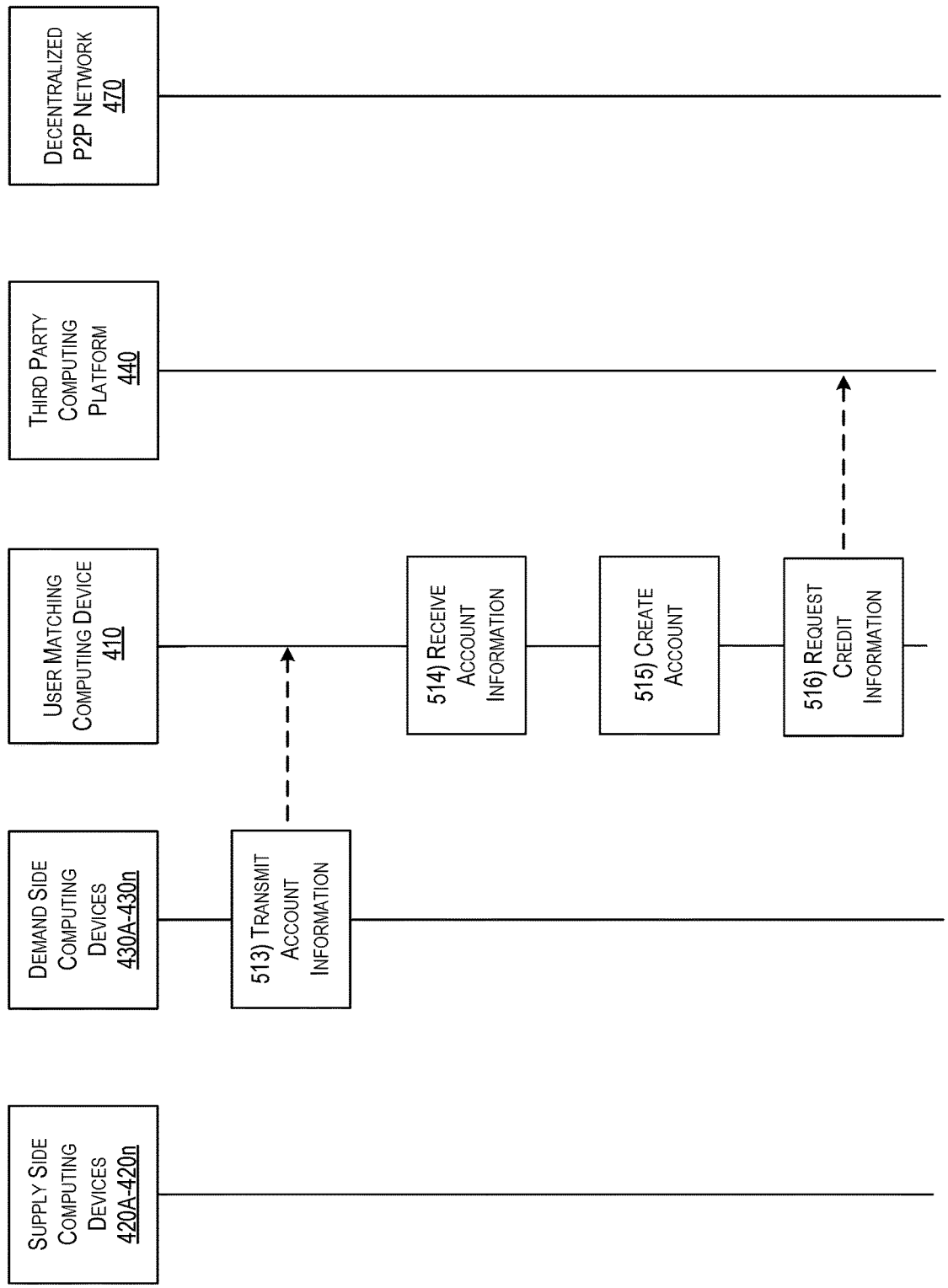

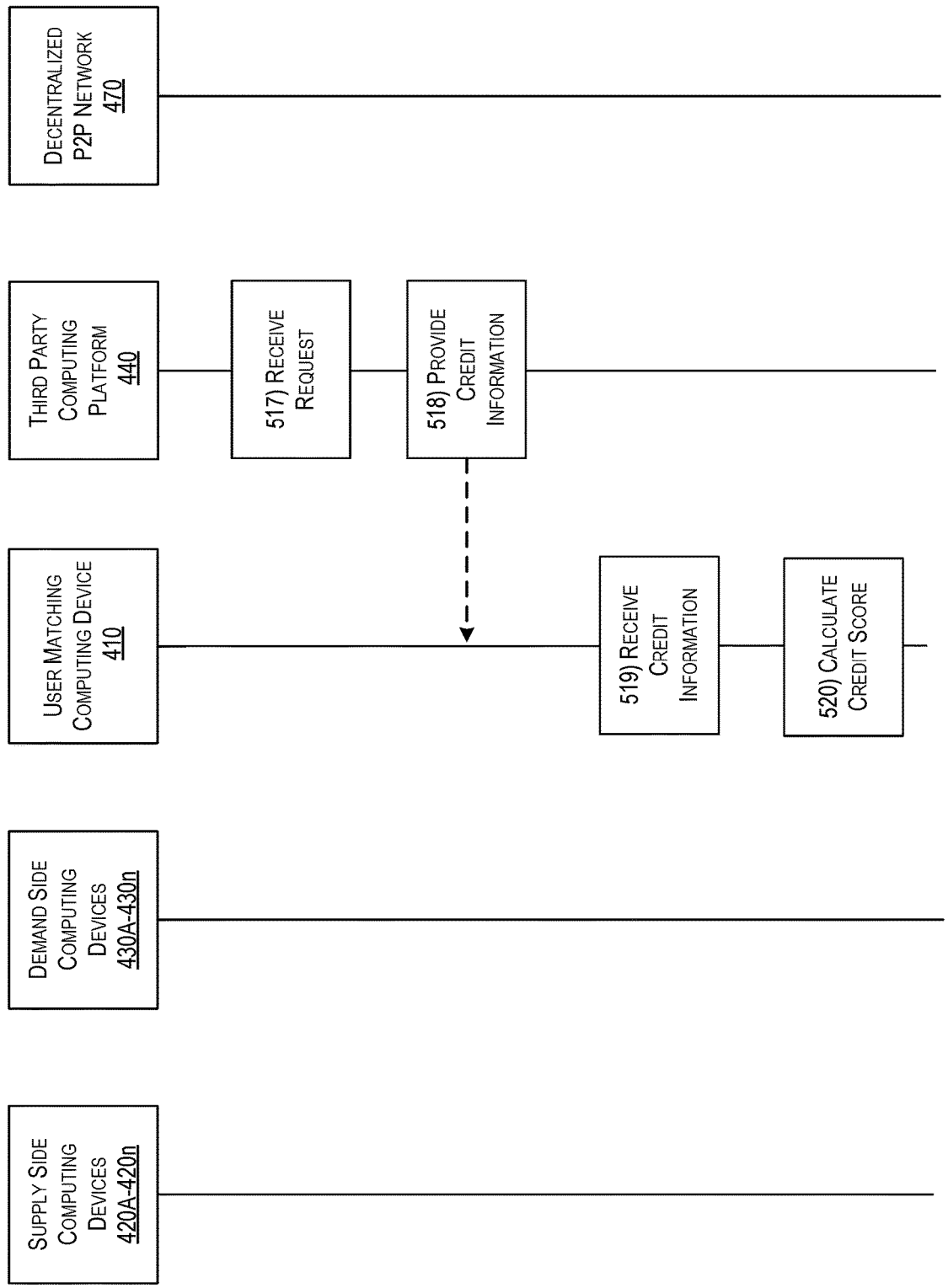

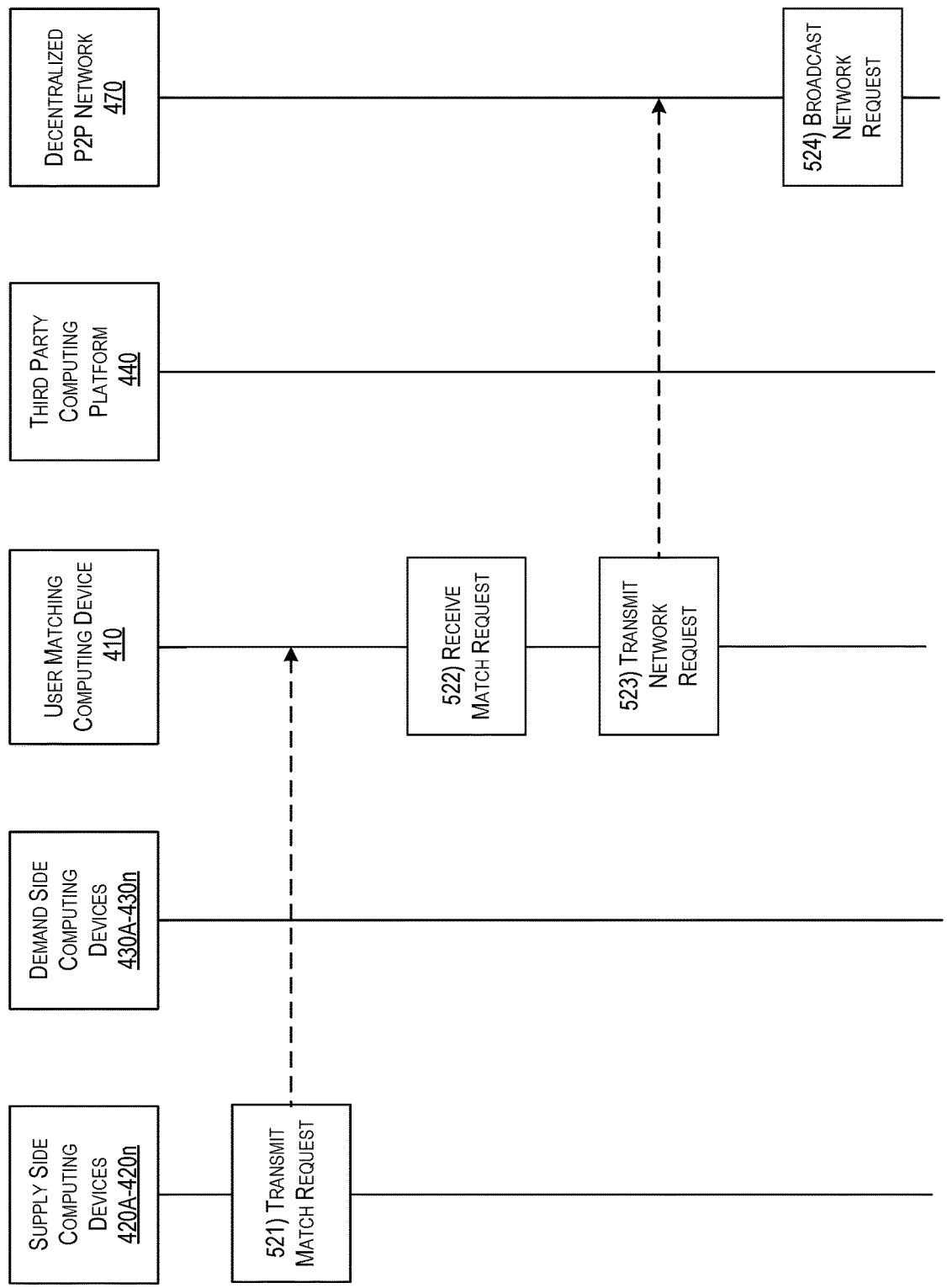

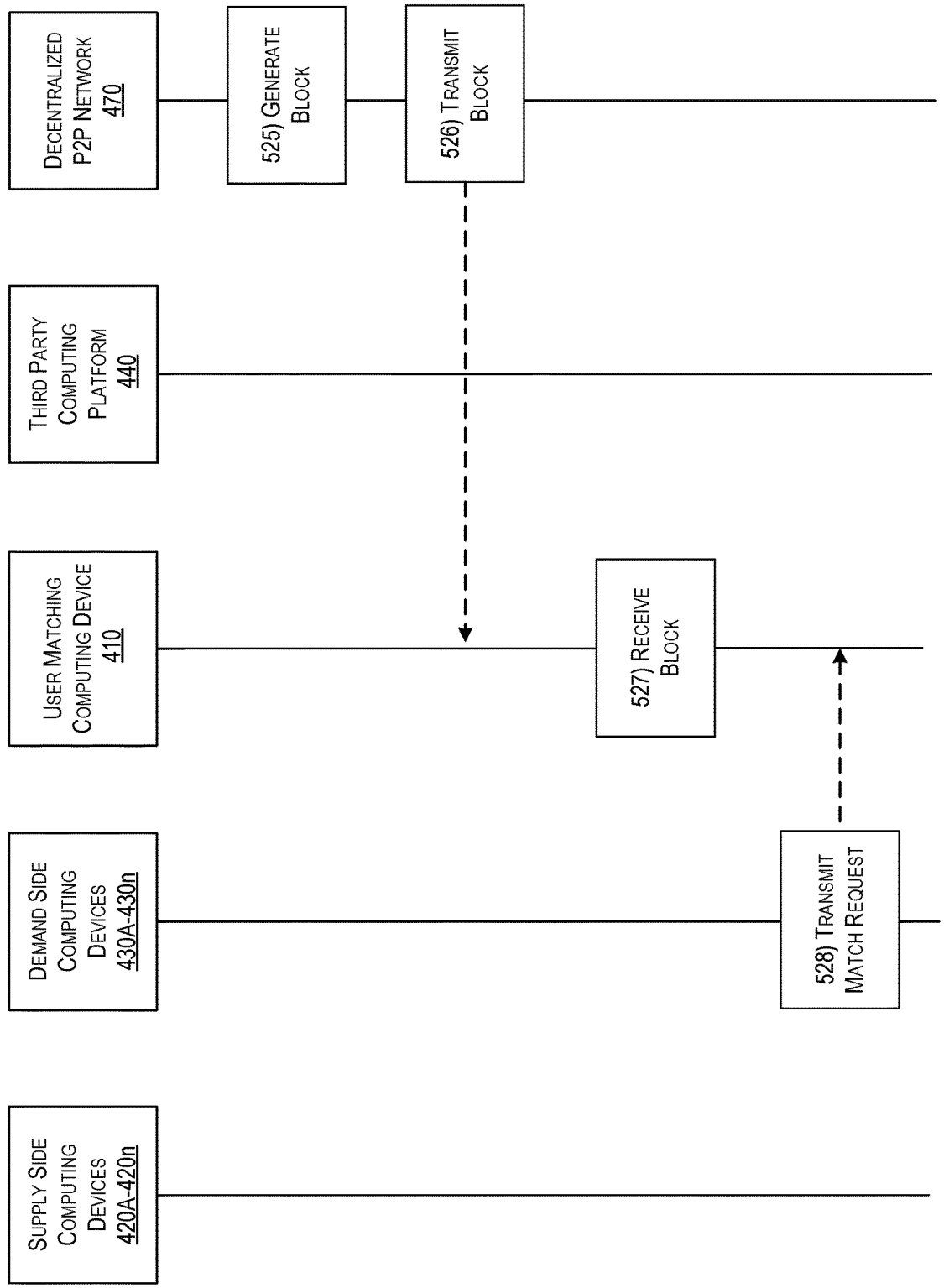

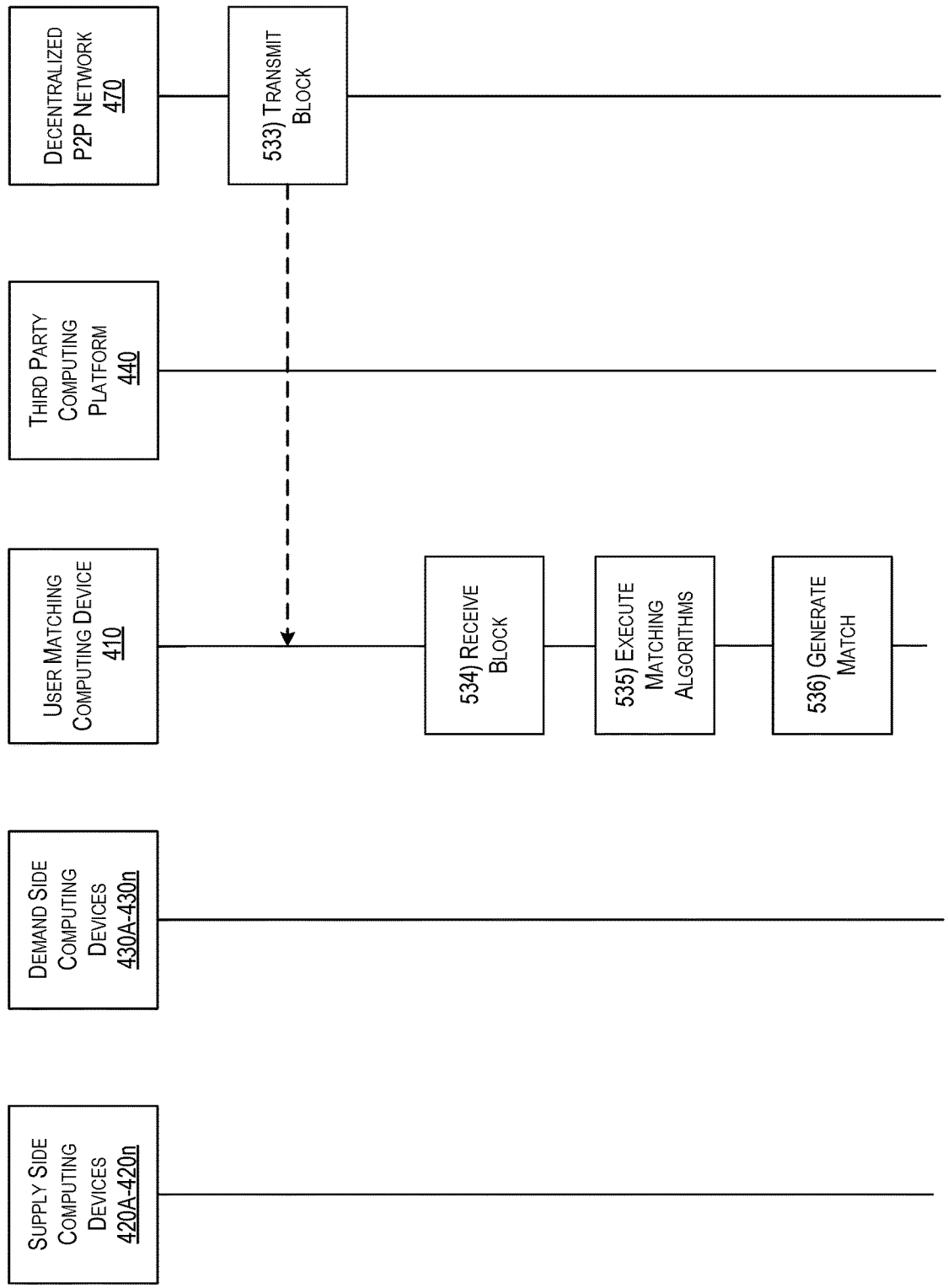

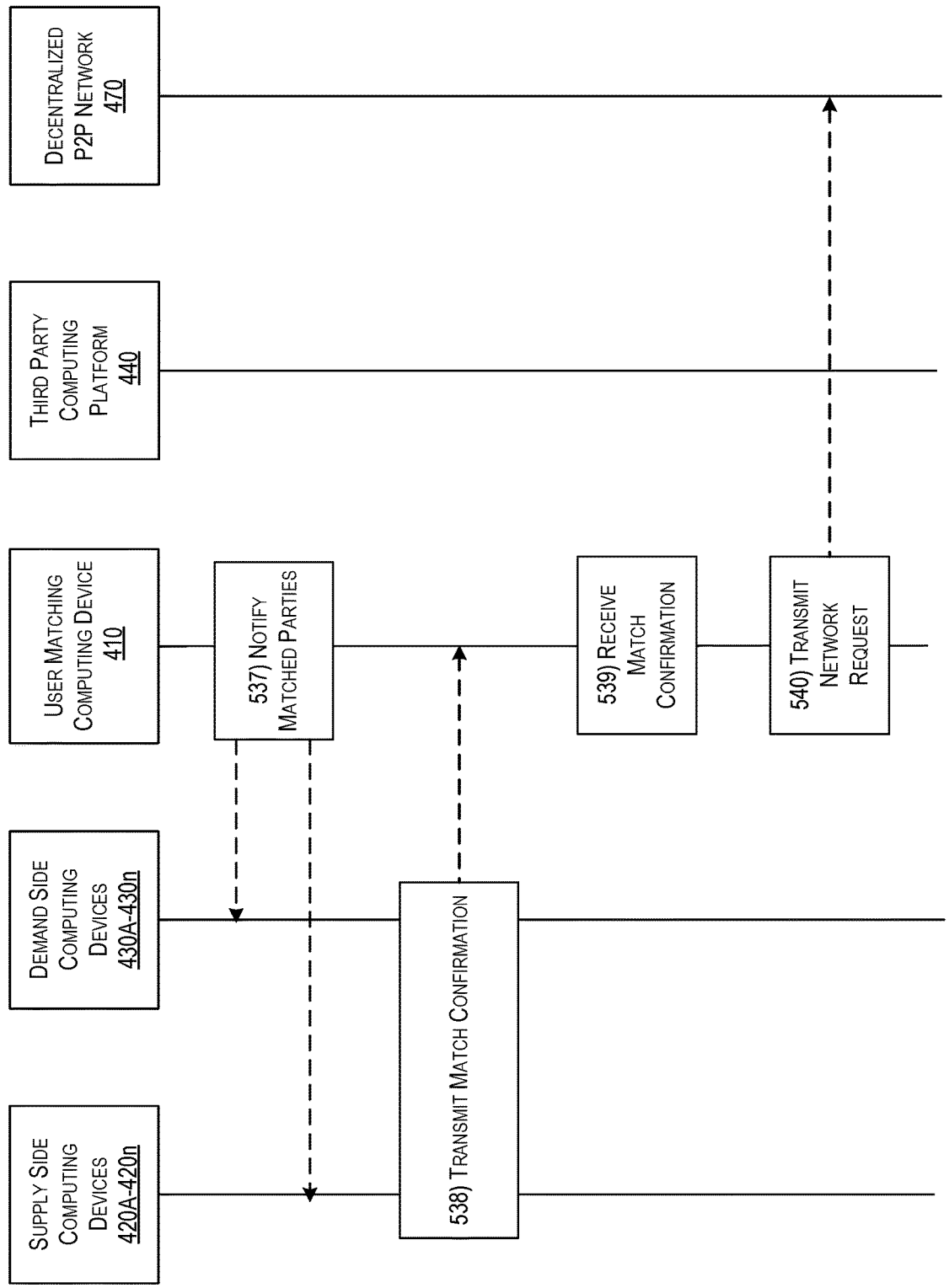

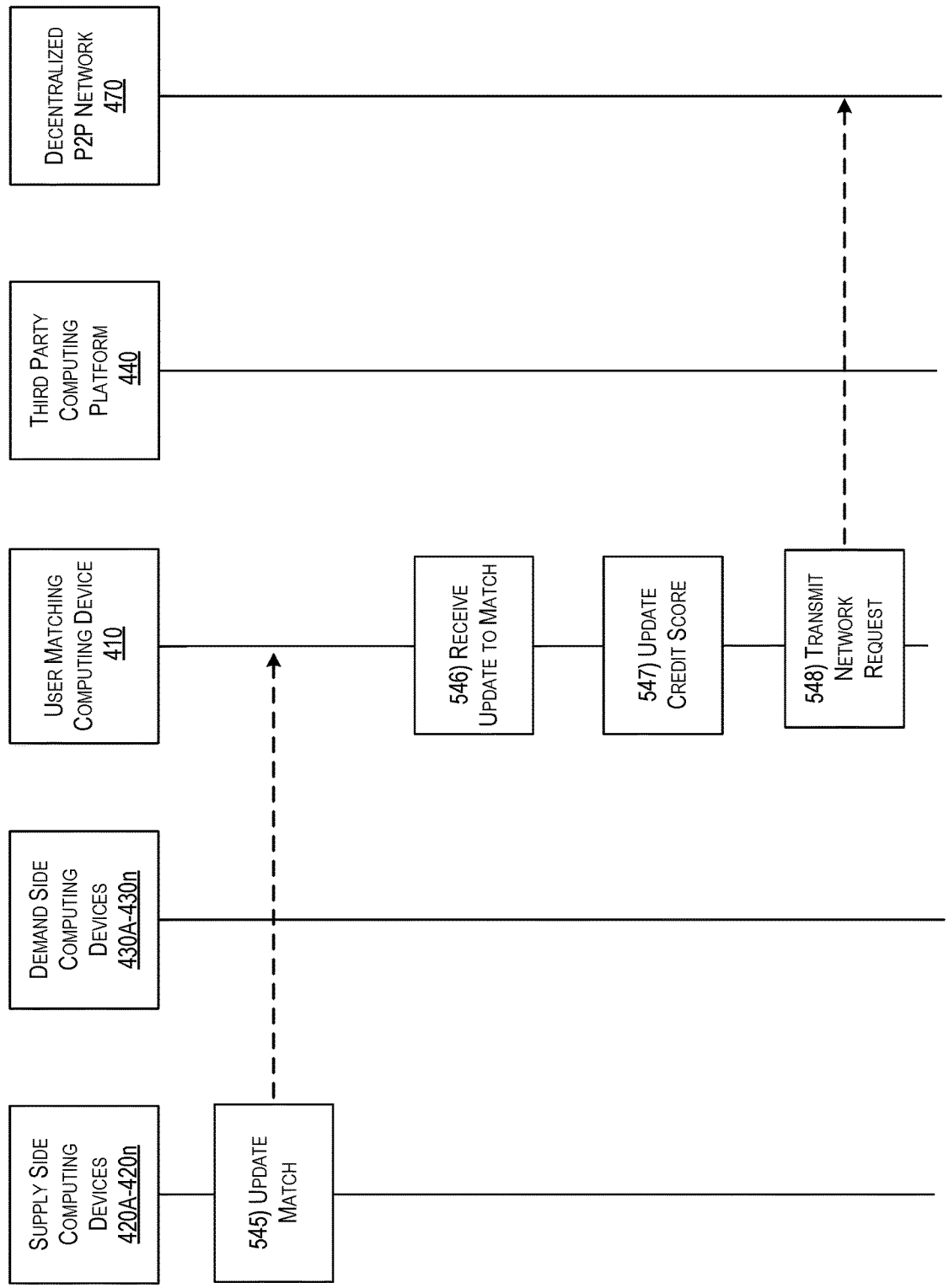

BLOCKCHAIN-BASED AUTOMATED USER MATCHING

FIELD

Aspects described herein generally relate to decentralized peer-to-peer (e.g., P2P) computer systems specialized for the purpose of managing a blockchain. In particular, one or more aspects of the disclosure relate to using artificial intelligence algorithms, stored on and/or off a blockchain, to facilitate match making between a first plurality of users and a second plurality of users.

BACKGROUND

Users access many systems across a variety of technologies ranging from financial services to insurance which facilitate match making between the users of the system. Typically, match making may occur on a one-to-one basis and may be performed at a computing hub associated with the system. By performing match making in such a manner, however, the system creates vulnerabilities and inefficiencies. Namely, the one-to-one match making arrangement is unable to handle matching over a plurality of parties, which may be detrimental to the efficacy of the system in providing services to users. Additionally, having match making performed solely by the computing hub associated with the system creates a singular trust relationship between the users of the system and the system itself, which may produce a centralized point to take advantage of vulnerabilities of match making.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

To overcome limitations in the prior art described above, and to overcome other limitations that will be apparent upon reading and understanding the present specification, aspects described herein are directed towards apparatuses, systems, and methods for blockchain-based automated user matching.

In accordance with one or more embodiments, a computing device configured to operate in a P2P network and including at least one or more processors and memory storing at least a portion of blockchain of the P2P network may receive supply side match parameters from one or more supply side customers through a supply side user interface associated with the computing device. The computing device may receive demand side match parameters from one or more demand side customers through a demand side user interface associated with the computing device. The computing device may match the supply side match parameters with the demand side match parameters based on execution of a matcher artificial intelligence algorithm, wherein the execution of the matcher artificial intelligence algorithm produces match data related to the supply side match parameters and the demand side match parameters. The computing device may transmit a network function request including the match data to the P2P network and may process the network function request to add a block to the blockchain, wherein the block comprises the match data.

In some embodiments, the supply side match parameters may include first supply side match parameters from a first supply side customer, wherein the demand side match parameters may include first demand side match parameters from a first demand side customer, and wherein the execution of the matcher artificial intelligence algorithm may produce first match data relating the first supply side customer with the first demand side customer.

In some embodiments, the supply side match parameters may include first supply side match parameters from a first supply side customer and second supply side match parameters from a second supply side customer, wherein the demand side match parameters may include first demand side match parameters from a first demand side customer, and wherein the execution of the matcher artificial intelligence algorithm may produce first match data relating the first supply side customer and the second supply side customer with the first demand side customer.

In some embodiments, the supply side match parameters may include first supply side match parameters from a first supply side customer, wherein the demand side match parameters may include first demand side match parameters from a first demand side customer and second supply side match parameters from a second demand side customer, and wherein the execution of the matcher artificial intelligence algorithm may produce first match data relating the first supply side customer with the first demand side customer and the second demand side customer.

In some embodiments, responsive to matching the supply side match parameters with the demand side match parameters, the computing device may transmit a match notification to one or more computing devices corresponding to one or more supply side customers associated with the supply side match parameters and one or more computing devices corresponding to one or more demand side customers associated with the demand side match parameters. The computing device may receive confirmations from each of the one or more computing devices corresponding to the one or more supply side customers associated with the supply side match parameters and each of the one or more computing devices corresponding to the one or more demand side customers associated with the demand side match parameters. Based on the confirmations, the computing device may transmit the network function request including the match data to the P2P network.

In some embodiments, prior to receiving the supply side match parameters from the one or more supply side customers and the demand side match parameters from the one or more demand side customers, the computing device may generate user accounts for each of the one or more supply side customers and the one or more demand side customers. The computing device may retrieve, from one or more third party computing devices, credit related data for each of the one or more demand side customers based on the generated accounts for each of the one or more demand side customers, and wherein the matching of the supply side match parameters with the demand side match parameters based on execution of a matcher artificial intelligence algorithm may incorporate the credit related data.

In some embodiments, the computing device may generate credit scores associated with each of the one or more demand side customers, wherein the network request includes each of the credit scores. The computing device may receive an update to the match data from at least one of the one or more supply side customers and the one or more demand side customers. The computing device may update each of the credit scores based on the update to the match data. The computing device may transmit another network function request including at least the update to match data and each of the updated credit scores.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein:

FIGS. 5A-5L depict an illustrative event sequence for blockchain-based automated user matching in accordance with one or more example embodiments described herein.

DETAILED DESCRIPTION

Figure 1:
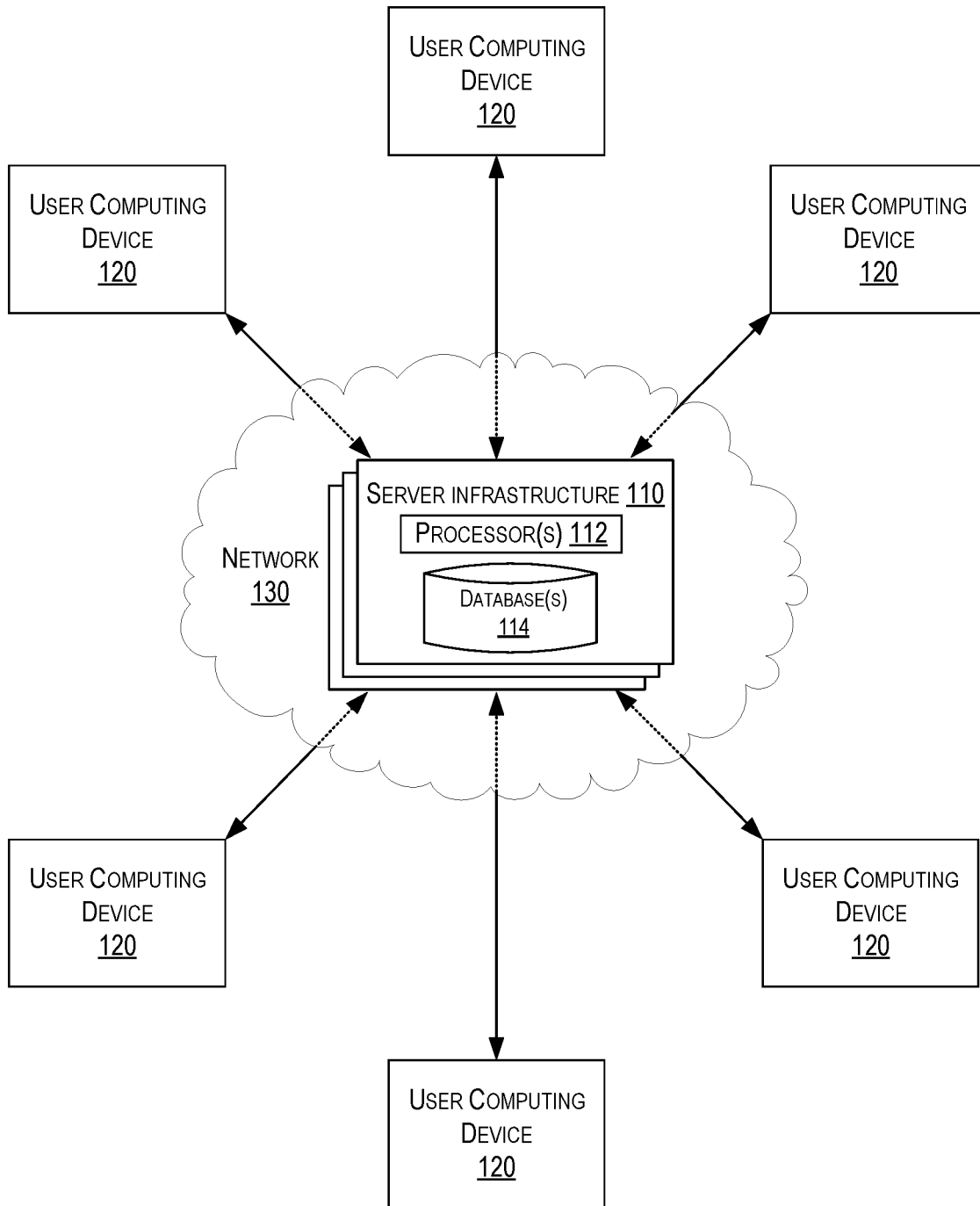
FIG. 1 depicts an illustrative centralized computer system that may be used in accordance with one or more example embodiments described herein.

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in further detail below, aspects described herein are directed towards apparatuses, systems, and methods for using artificial intelligence algorithms, stored on and/or off a blockchain, to facilitate match making between a first plurality of users and a second plurality of users.

An automated user matching system may be configured to facilitate match making between a first plurality of users and a second plurality of users. The automated user matching system may include a plurality of full node computing devices, in some instances associated with a specific entity such as a financial institution, which may operate in concert to create a decentralized P2P network and maintain a blockchain, either public or private. The automated user matching system may further include a user matching computing device which may be configured to interface with the decentralized network and blockchain, as either a full node or lightweight node in the decentralized network, as well as computing devices respectively associated with each of the first plurality of users and each of the second plurality of users.

The user matching computing device may provide a first user interface configured to engage with the first plurality of users and a second user interface configured to engage with a second plurality of users. Furthermore, the user matching computing device may be configured to match one or more of the first plurality of users with one or more of the second plurality of users based artificial intelligence algorithms and data provided by the one or more of the first plurality of users and the one or more of the second plurality of users. In some instances, the matching may occur on the blockchain through execution of a smart contract which stores the artificial intelligence algorithms and data provided by the one or more of the first plurality of users and the one or more of the second plurality of users.

For example, each of the first plurality of users may be respectively associated with one or more supply side computing devices. Through the respective one or more supply side computing devices, each of the first plurality of users may be able to interface with the first user interface provided by the user matching computing device. In doing so, each of the first plurality of users may be able to provide one or more supply side match parameters to the user matching computing device. Similarly, each of the second plurality of users may be respectively associated with one or more demand side computing devices. Through the respective one or more demand side computing devices, each of the second plurality of users may be able to interface with the second user interface provided by the user matching computing device. In doing so, each of the second plurality of users may be able to provide one or more demand side match parameters to the user matching computing device.

Additionally and/or alternatively, the user matching computing device may transmit the one or more supply side match parameters and the one or more demand side match parameters to the distributed network and each of the full node computing devices operating on the distributed network to store the one or more supply side match parameters and the one or more demand side match parameters on the blockchain. In particular, the supply and demand side match parameters may be transmitted to a smart contract on the blockchain, which may facilitate matching between the supply and demand side match parameters and, in turn, between one or more of the first plurality of users with one or more of the second plurality of users.

In order to facilitate the matching process, the user matching computing device may execute one or more matcher artificial intelligence (e.g., AI) algorithms to match the one or more supply side match parameters provided by the first plurality of users with the one or more demand side match parameters provided by the second plurality of users. In doing so, the user matching computing device may use the one or more matcher AI algorithms to optimize the matching between the supply side parameters and the demand side parameters. For example, the one or more artificial intelligence algorithms may cause the automated user matching computing device to dynamically link the one or more supply side match parameters with the one or more demand side match parameters based on a data correlation between the two sides. Additionally and/or alternatively, the one or more matcher AI algorithms may be included in one or more smart contracts stored on the blockchain supported by the decentralized P2P network and the matching operations may be performed through the one or more smart contracts on the blockchain by each of the full node computing devices comprising the P2P network.

By performing match making in such a manner, the automated user matching system may address the existing vulnerabilities and inefficiencies of current systems. Namely, the automated user matching system may be able to facilitate match making on a greater than one-to-one basis thereby increasing matching efficiency. Furthermore, through enabling match making to be undertaken through smart contracts on the blockchain, the automated user matching system may create an arrangement in which match making processes are distributed across a plurality of computing devices, as opposed to a central authority, which may reduce the vulnerabilities of a centralized matching authority.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "mounted," "connected," "coupled," "positioned," "engaged" and similar terms, is meant to include both direct and indirect mounting, connecting, coupling, positioning and engaging.

The disclosure provided herein is described, at least in part, in relation to a decentralized peer-to-peer (e.g., P2P) system specialized for the purpose of managing a blockchain. The decentralized P2P system may be comprised of computing devices that are distributed in multiple locations across a geographical area as opposed to a single location. The computing devices forming the decentralized P2P system may operate with each other to manage a blockchain, which may be a data structure used to store information related to the decentralized P2P system. More specifically, the blockchain may be a chronological linkage of data elements (e.g., blocks) which store data records relating to the decentralized computing system.

A user may access the decentralized P2P system through a specialized "wallet" that serves to uniquely identify the user and enable the user to perform functions related to the decentralized P2P network. Through the wallet, the user may be able to hold tokens, funds, and/or any other asset associated with the decentralized P2P system. Furthermore, the user may be able to use the wallet to request performance of network-specific functions related to the decentralized P2P system such as fund, token, and/or asset transfers. The various computing devices forming the decentralized P2P computing system may operate as a team to perform network-specific functions requested by the user. In performing the network-specific functions, the various computing devices may produce blocks that store the data generated during the performance of the network-specific functions and may add the blocks to the blockchain. After the block has been added to the blockchain, the wallet associated with the user may indicate that the requested network-specific function has been performed.

For example, a user may have a wallet which reflects that the user has five tokens associated with the decentralized P2P system. The user may provide a request to the decentralized P2P system to transfer the five tokens to a friend who also has a wallet. The various computing devices forming the decentralized P2P computing system may perform the request and transfer the five tokens from the wallet of the user to the wallet of the friend. In doing so, a block may be created by the various computing devices of the decentralized P2P computing system. The block may store data indicating that the five tokens were transferred from the wallet of the user to the wallet of the friend. The various computing devices may add the block to the blockchain. At such a point, the wallet of the user may reflect the transfer of the five tokens to the wallet of the friend, and may indicate a balance of zero. The wallet of the friend, however, may also reflect the transfer of the five tokens and may have a balance of five tokens.

In more detail, the decentralized P2P system may be specialized for the purpose of managing a distributed ledger, such as a private blockchain or a public blockchain, through the implementation of digital cryptographic hash functions, consensus algorithms, digital signature information, and network-specific protocols and commands. The decentralized P2P system (e.g., decentralized system) may be comprised of decentralized system infrastructure consisting of a plurality computing devices, either of a heterogeneous or homogenous type, which serve as network nodes (e.g., full nodes and/or lightweight nodes) to create and sustain a decentralized P2P network (e.g., decentralized network). Each of the full network nodes may have a complete replica or copy of a blockchain stored in memory and may operate in concert, based on the digital cryptographic hash functions, consensus algorithms, digital signature information, and network-specific protocols, to execute network functions and/or maintain inter-nodal agreement as to the state of the blockchain. Each of the lightweight network nodes may have at least a partial replica or copy of the blockchain stored in memory and may request performance of network functions through the usage of digital signature information, hash functions, and network commands. In executing network functions of the decentralized network, such as balance sheet transactions and smart contract operations, at least a portion of the full nodes forming the decentralized network may execute the one or more cryptographic hash functions, consensus algorithms, and network-specific protocols to register a requested network function on the blockchain. In some instances, a plurality of network function requests may be broadcasted across at least a portion of the full nodes of the decentralized network and aggregated through execution of the one or more digital cryptographic hash functions and by performance of the one or more consensus algorithms to generate a single work unit (e.g., block), which may be added in a time-based, chronological manner to the blockchain through performance of network-specific protocols.

While in practice the term "blockchain" may hold a variety of contextually derived meanings, the term blockchain, as used herein, refers to a concatenation of sequentially dependent data elements (e.g., blocks) acting as a data ledger that stores records relating to a decentralized computing system. Such data records may be related to those used by a particular entity or enterprise, such as a financial institution, and/or may be associated with a particular application and/or use case including, but not limited to, cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference, among others. A "private blockchain" may refer to a blockchain of a decentralized private system in which only authorized computing devices are permitted to act as nodes in a decentralized private network and have access to the private blockchain. In some instances, the private blockchain may be viewable and/or accessible by authorized computing devices which are not participating as nodes within the decentralized private network, but still have proper credentials. A "public blockchain" may refer to a blockchain of a decentralized public system in which any computing devices may be permitted to act as nodes in a decentralized public network and have access to the public blockchain. In some instances, the public blockchain may be viewable and/or accessible by computing devices which are not participating as nodes within the decentralized public network.

Further, a "full node" or "full node computing device," as used herein, may describe a computing device in a decentralized system which operates to create and maintain a decentralized network, execute requested network functions, and maintain inter-nodal agreement as to the state of the blockchain. In order to perform such responsibilities, a computing device operating as a full node in the decentralized system may have a complete replica or copy of the blockchain stored in memory, as well as executable instructions for the execution of hash functions, consensus algorithms, digital signature information, network protocols, and network commands. A "lightweight node," "light node," "lightweight node computing device," or "light node computing device" may refer to a computing device in a decentralized system, which operates to request performance of network functions (e.g., balance sheet transactions, smart contract operations, and the like) within a decentralized network but without the capacity to execute requested network functions and maintain inter-nodal agreement as to the state of the blockchain. As such, a computing device operating as a lightweight node in the decentralized system may have a partial replica or copy of the blockchain. In some instances, network functions requested by lightweight nodes to be performed by the decentralized network may also be able to be requested by full nodes in the decentralized system.

"Network functions" and/or "network-specific functions," as described herein, may relate to functions which are able to be performed by nodes of a decentralized P2P network. In some arrangements, the data generated in performing network-specific functions may or may not be stored on a blockchain associated with the decentralized P2P network. Examples of network functions may include "smart contract operations" and "balance sheet transaction." A smart contract operation, as used herein, may describe one or more operations associated with a "smart contract," which may be one or more algorithms and/or programs stored on a blockchain and identified by one or more wallets and/or public keys within a decentralized P2P network. In performing a smart contract operation, each full node computing device within a decentralized P2P network may identify a block within a blockchain comprising the smart contract and, responsive to identifying the block associated with the smart contract, may execute the one or more algorithms and/or programs of the smart contract. A balance sheet transaction may describe one or more changes to data holdings associated with one or more nodes within a decentralized network.

In one or more aspects of the disclosure, a "digital cryptographic hash function," as used herein, may refer to any function which takes an input string of characters (e.g., message), either of a fixed length or non-fixed length, and returns an output string of characters (e.g., hash, hash value, message digest, digital fingerprint, digest, and/or checksum) of a fixed length. Examples of digital cryptographic hash functions may include BLAKE (e.g., BLAKE-256, BLAKE-512, and the like), MD (e.g., MD2, MD4, MD5, and the like), Scrypt, SHA (e.g., SHA-1, SHA-256, SHA-512, and the like), Skein, Spectral Hash, SWIFT, Tiger, and so on. A "consensus algorithm," as used herein and as described in further detail below, may refer to one or more algorithms for achieving agreement on one or more data values among nodes in a decentralized network. Examples of consensus algorithms may include proof of work (e.g., PoW), proof of stake (e.g., PoS), delegated proof of stake (e.g., DPoS), practical byzantine fault tolerance algorithm (e.g., PBFT), and so on. Furthermore, "digital signature information" may refer to one or more private/public key pairs and digital signature algorithms which are used to digitally sign a message and/or network function request for the purposes of identity and/or authenticity verification. Examples of digital signature algorithms which use private/public key pairs contemplated herein may include public key infrastructure (PKI), Rivest-Shamir-Adleman signature schemes (e.g., RSA), digital signature algorithm (e.g., DSA), Edwards-curve digital signature algorithm, and the like. A "wallet," as used herein, may refer to one or more data and/or software elements (e.g., digital cryptographic hash functions, digital signature information, and network-specific commands) that allow a node in a decentralized P2P network to interact with the decentralized P2P network. A wallet may be associated with a public key, which may serve to identify the wallet. In requesting performance of network operations, a private key associated with the wallet may be used to digitally sign the network operation requests.

As will be described in further detail below, a decentralized P2P system implementing a blockchain data structure may provide solutions to technological problems existing in current centralized system constructs with traditional data storage arrangements. For example, conventional data storage arrangements that use a central data authority have a single point of failure (namely, the central storage location) which, if compromised by a malicious attacker, can lead to data tampering, unauthorized data disclosure, and misuse and/or loss of operative control of the processes performed by the centralized system. The implementation of a blockchain data structure in a decentralized P2P system acts as a safeguard against unreliable and/or malicious nodes acting in the decentralized P2P network to undermine the work efforts of the other nodes, e.g., by providing byzantine fault tolerance within the network.

Computing Architectures

FIG. 1 depicts an illustrative example of centralized computer system 100 in accordance with one or more illustrative aspects described herein. Centralized computer system 100 may comprise one or more computing devices including at least server infrastructure 110 and user computing devices 120. Each of user computing devices 120 may be configured to communicate with server infrastructure 110 through network 130. In some arrangements, centralized computer system 100 may include additional computing devices and networks that are not depicted in FIG. 1, which also may be configured to interact with server infrastructure 110 and, in some instances, user computing devices 120.

Server infrastructure 110 may be associated with a distinct entity such as a company, school, government, and the like, and may comprise one or more personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), and the like.

Server infrastructure 110 may include computing hardware and software that may host various data and applications for performing tasks of the centralized entity and for interacting with user computing devices 120, as well as other computing devices. For example, each of the computing devices comprising server infrastructure 110 may include at least one or more processors 112 and one or more databases 114, which may be stored in memory of the one or more computing devices of server infrastructure 110. Through execution of computer-readable instructions stored in memory, the computing devices of server infrastructure 110 may be configured to perform functions of the centralized entity and store the data generated during the performance of such functions in databases 114.

In some arrangements, server infrastructure 110 may include and/or be part of enterprise information technology infrastructure and may host a plurality of enterprise applications, enterprise databases, and/or other enterprise resources. Such applications may be executed on one or more computing devices included in server infrastructure 110 using distributed computing technology and/or the like. In some instances, server infrastructure 110 may include a relatively large number of servers that may support operations of a particular enterprise or organization, such as a financial institution. Server infrastructure 110, in this embodiment, may generate a single centralized ledger for data received from the various user computing devices 120, which may be stored in databases 114.

Each of the user computing devices 120 may be configured to interact with server infrastructure 110 through network 130. In some instances, one or more of the user computing devices 120 may be configured to receive and transmit information corresponding to system requests through particular channels and/or representations of webpages and/or applications associated with server infrastructure 110. The system requests provided by user computing devices 120 may initiate the performance of particular computational functions such as data and/or file transfers at server infrastructure 110. In such instances, the one or more of the user computing devices may be internal computing devices associated with the particular entity corresponding to server infrastructure 110 and/or may be external computing devices which are not associated with the particular entity.

As stated above, centralized computer system 100 also may include one or more networks, which may interconnect one or more of server infrastructure 110 and one or more user computing devices 120. For example, centralized computer system 100 may include network 130. Network 130 may include one or more sub-networks (e.g., local area networks (LANs), wide area networks (WANs), or the like). Furthermore, centralized computer system 100 may include a local network configured to interlink each of the computing devices comprising server infrastructure 110.

Furthermore, in some embodiments, centralized computer system 100 may include a plurality of computer systems arranged in an operative networked communication arrangement with one another through a network, which may interface with server infrastructure 110, user computing devices 120, and network 130. The network may be a system specific distributive network receiving and distributing specific network feeds and identifying specific network associated triggers. The network may also be a global area network (GAN), such as the Internet, a wide area network (WAN), a local area network (LAN), or any other type of network or combination of networks. The network may provide for wireline, wireless, or a combination wireline and wireless communication between devices on the network.

In the centralized computer system 100 described in regard to FIG. 1, server infrastructure 110 may serve as a central authority which manages at least a portion of the computing data and actions performed in relation to the particular entity associated with server infrastructure 110. As such, server infrastructure 110 of centralized computer system 100 provides a single point of failure which, if compromised by a malicious attacker, can lead to data tampering, unauthorized data disclosure, and misuse and/or loss of operative control of the processes performed by the server infrastructure 110 in relation to the particular entity associated with server infrastructure 110. In such a centralized construct in which a single point of failure (e.g., server infrastructure 110) is created, significant technological problems arise regarding maintenance of operation and data control, as well as preservation of data integrity. As will be described in further detail below in regard to FIG. 2, such technological problems existing in centralized computing arrangements may be solved by a decentralized P2P system implementing a blockchain data structure, even wholly within the server infrastructure 110.

Figure 2:
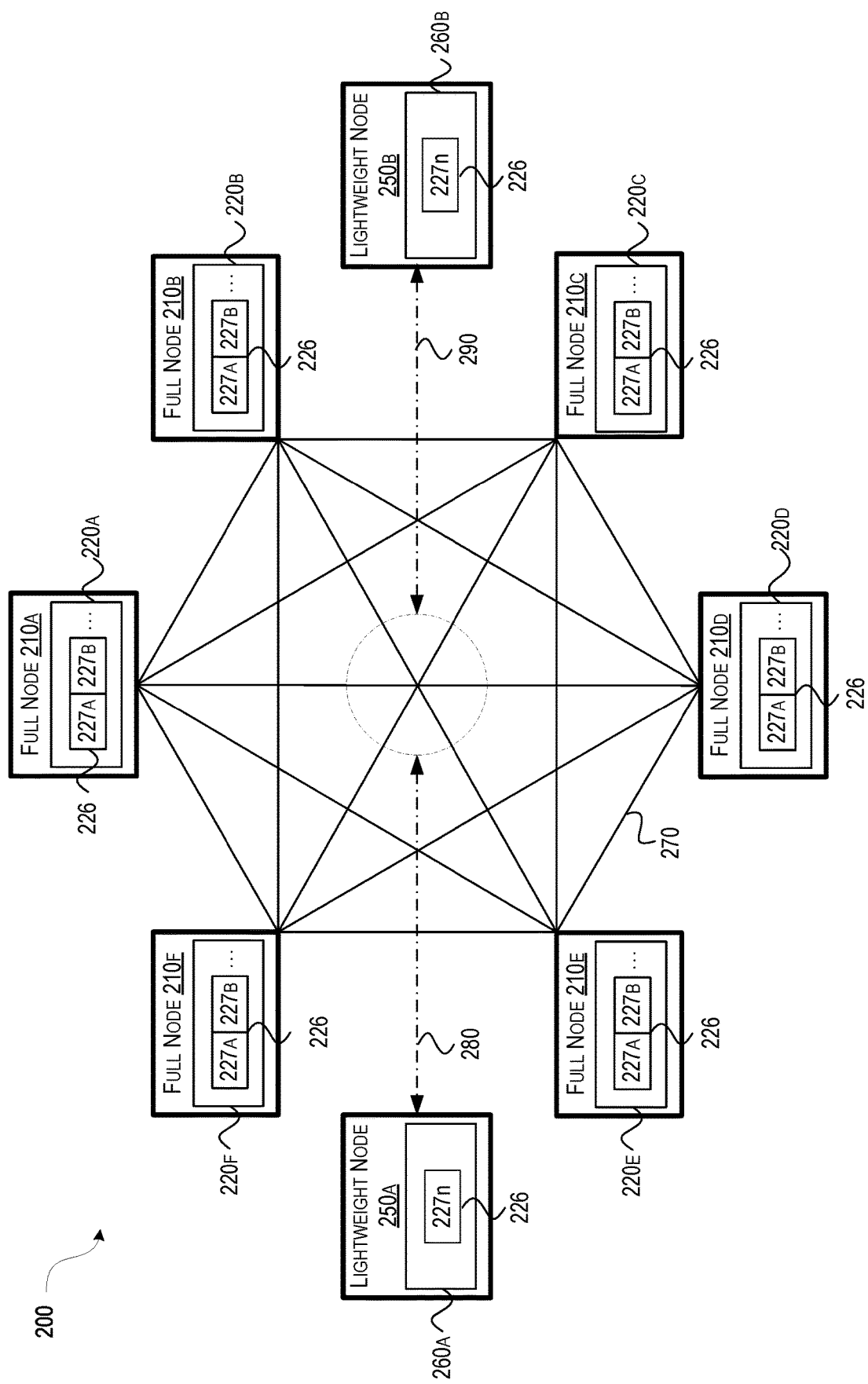
FIG. 2 depicts an illustrative decentralized P2P computer system that may be used in accordance with one or more example embodiments described herein.

FIG. 2 depicts an illustrative example of decentralized P2P computer system 200 that may be used in accordance with one or more illustrative aspects described herein. Decentralized P2P computer system 200 may include a plurality of full node computing devices 210A, 210B, 210C, 210D, 210E, and 210F and lightweight node computing devices 250A and 250B, which may be respectively similar to full node computing device 210 described in regard to FIG. 3A and lightweight node computing device 250 described in regard to FIG. 3B. While a particular number of full node computing devices and lightweight node computing devices are depicted in FIG. 2, it should be understood that a number of full node computing devices and/or lightweight node computing devices greater or less than that of the depicted full node computing devices and lightweight node computing devices may be included in decentralized P2P computer system 200. Accordingly, any additional full node computing devices and/or lightweight node computing devices may respectively perform in the manner described below in regard to full node computing devices 210A-210F and lightweight node computing devices 250A and 250B in decentralized P2P computer system 200.

Each of full node computing devices 210A-210F may operate in concert to create and maintain decentralized P2P network 270 of decentralized P2P computer system 200. In creating decentralized P2P network 270 of decentralized P2P computer system 200, processors, ASIC devices, and/or graphics processing units (e.g., GPUs) of each full node computing device 210A-210F may execute network protocols which may cause each full node computing device 210A-210F to form a communicative arrangement with the other full node computing devices 210A-210F in decentralized P2P computer system 200 and thereby create decentralized P2P network 270. Furthermore, the execution of network protocols by the processors, ASIC devices, and/or GPUs of full node computing devices 210A-210F may cause full node computing devices 210A-210F to execute network functions related to blockchain 226 and maintain decentralized P2P network 270.

Lightweight node computing devices 250A and 250B may request execution of network functions related to decentralized P2P network 270. In order to request execution of network functions, such as balance sheet transaction and/or smart contract operations, processors of lightweight node computing devices 250A and 250B may execute network commands to broadcast the network functions to decentralized P2P network 270 comprising full node computing devices 210A-210F.

For example, lightweight node computing device 250A may request execution of a balance sheet transaction related to decentralized P2P network 270, which may entail a data transfer from a wallet associated with lightweight node computing device 250A to a wallet associated with lightweight node 250B. In doing so, processors of lightweight node computing device 250A may execute network commands to broadcast balance sheet transaction network function request 280 to decentralized P2P network 270. Balance sheet transaction network function request 280 may include details about the data transfer such as data type and amount, as well as a data transfer amount to full node computing devices 210A-201F of decentralized P2P network 270 for executing balance sheet transaction network function request 280. Balance sheet transaction network function request 280 may further include the public key associated with the wallet of lightweight node computing device 250B. Processors of lightweight node computing device 250A may execute digital signature algorithms to digitally sign balance sheet transaction network function request 280 with the private key associated with the wallet of lightweight node computing device 250A.

At decentralized P2P network 270, balance sheet transaction network function request 280 may be broadcasted to each of full node computing devices 210A-210F through execution of network protocols by full node computing devices 210A-210F. In order to execute balance sheet transaction network function request 280 and maintain internodal agreement as to the state of blockchain 226, processors, ASIC devices, and/or GPUs of full node computing devices 210A-210F may execute network protocols to receive broadcast of the network function through decentralized P2P network 270 and from lightweight node computing device 250A. Processors, ASIC devices, and/or GPUs of full node computing devices 210A-210F may execute hash functions to generate a digest of balance sheet transaction network function request 280. The resultant digest of balance sheet transaction network function request 280 may, in turn, be hashed with the block hash of the most immediately preceding block of blockchain 226. Processors, ASIC devices, and/or GPUs of full node computing devices 210A-210F may execute consensus algorithms to identify a numerical value (e.g., nonce) corresponding to the particular executed consensus algorithm and related to the digest that combines the digest of the balance sheet transaction network function request 280 and the block hash of the most immediately preceding block of blockchain 226.

For example, in embodiments in which the consensus algorithm is proof of work (e.g., PoW), processors, ASIC devices, and/or GPUs of full node computing devices 210A-210F may perform a plurality of hashing operations to identify a nonce that, when hashed with the digest that combines the digest of the balance sheet transaction network function request 280 and the block hash of the most immediately preceding block of blockchain 226, produces a hash of a predetermined alphanumerical format. Such a predetermined alphanumerical format may include a predetermined number of consecutive alphanumerical characters at a predetermined position within the resultant digest that combines the nonce, digest of the balance sheet transaction network function request 280, and block hash of the most immediately preceding block of blockchain 226.

In embodiments in which the consensus algorithm is proof of stake (e.g., PoS), a private key associated with one of full node computing devices 210A-210F may be pseudo-randomly selected, based on balance sheet holdings associated with the public keys of full node computing devices 210A-210F, to serve as the nonce. For example, through execution of the PoS consensus algorithm, full node computing devices 210A-210F are entered into a lottery in which the odds of winning are proportional to a balance sheet amount associated the wallet of each of full node computing devices 210A-210F, wherein a larger balance sheet amount corresponds to a higher probability to win the lottery. The PoS consensus algorithm may cause a full node computing device from full node computing devices 210A-210F to be selected, and the public key of the wallet of the selected full node computing device to be used as the nonce.

In embodiments in which the consensus algorithm is delegated proof of stake (e.g., DpoS), a group of delegates are chosen from full node computing devices 210A-210F by each of computing devices 210A-210F, wherein full node computing devices 210A-210F are allowed to vote on delegates based on balance sheet holdings associated with the respective wallets. Full node computing devices 210A-210F, however, may not vote for themselves to be delegates. Once the group of delegates are chosen, the group of delegates from full node computing devices 210A-210F select a public key associated with a wallet of one of full node computing devices 210A-210F to serve as the nonce.

In embodiments in which the consensus algorithm is practical byzantine fault tolerance algorithm (e.g., PBFT), each of full node computing devices 210A-210F are associated with a particular status and/or ongoing specific information associated with the respective public key of the full node computing devices. Each of full node computing devices 210A-210F receive a message through decentralized P2P network 270 based on network protocols. Based on the received message and particular status and/or ongoing specific information, each of full node computing devices 210A-210F perform computational tasks and transmit a response to the tasks to each of the other full node computing devices 210A-210F. A public key of a wallet associated with a particular full node computing device from full node computing devices 210A-210F is selected by each of full node computing devices 210A-210F based on the response of the particular full node computing device best fulfilling criteria determined based on the network protocols.

The identification of the nonce enables processors, ASIC devices, and/or GPUs of the full node computing device from full node computing devices 210A-210F corresponding to the nonce to create a new block with a block header (e.g., block hash), which is a digest that combines the digest of balance sheet transaction network function request 280, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase balance sheet holdings associated with itself by a predetermined amount. In some arrangements, each of full node computing devices 210A-210F may receive an equal portion of the data transfer amount specified by lightweight node computing device 250A for executing balance sheet transaction network function request 280. After the new block has been added to blockchain 226, balance sheet transaction network function request 280 may be considered to be executed and the data transfer from the wallet associated with lightweight node computing device 250A to the wallet associated with lightweight node 250B may be registered.

As stated above, in some arrangements, a plurality of network function requests may be broadcasted across decentralized network P2P network 270. Processors, ASIC devices, and/or GPUs of full node computing devices 210A-210F may execute network protocols to receive broadcast of each of the network functions, including balance sheet transaction network function request 280, through decentralized P2P network 270 and from the requesting entities, including lightweight node computing device 250A. Processors, ASIC devices, and/or GPUs of full node computing devices 210A-210F may execute hash functions to generate a hash tree (e.g., Merkle tree) of the requested network functions, which culminates in a single digest (e.g., root digest, root hash, and the like) that comprises the digests of each of the requested network functions, including balance sheet transaction network function request 280. The root digest of the requested network function may, in turn, be hashed with the block hash of the most immediately preceding block of blockchain 226. Processors, ASIC devices, and/or GPUs of full node computing devices 210A-210B may execute consensus algorithms in the manner described above to identify a nonce corresponding to the particular executed consensus algorithm and related to the digest that combines the root digest of the requested network functions and the block hash of the most immediately preceding block of blockchain 226. The identification of the nonce enables processors, ASIC devices, and/or GPUs of the full node computing device from full node computing devices 210A-210F to create a new block with a block header (e.g., block hash), which is a digest that combines the root digest of the network function requests, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by each of the network function requests. After the new block has been added to blockchain 226, each of the network functions requests, including balance sheet transaction network function request 280, may be considered to be executed and the data transfer from the private/public key associated with lightweight node computing device 250A to the private/public key associated with lightweight node 250B may be registered.

While the description provided above is made in relation to a balance sheet transaction involving lightweight node computing device 250A and lightweight node computing device 250B, it is to be understood that balance sheet transactions are not limited to lightweight node computing device 250A and lightweight node computing device 250B, but rather may be made across any of the full node computing devices and/or lightweight node computing devices in decentralized P2P system 200.

For another example, lightweight node computing device 250B may request a smart contract operation related to decentralized P2P network 270, which may facilitate a dual data transfer between a wallet associated with lightweight node computing device 250B and a wallet associated with another node in decentralized P2P network 270, such as lightweight node computing device 250A, based on fulfillment of programmatic conditions established by a smart contract. Processors of lightweight node computing device 250B may execute network commands to broadcast smart contract operation network function request 290 to decentralized P2P network 270. Smart contract operation network function request 290 may include details about the data transfer such as data type and amount, as well as a data transfer amount to full node computing devices 210A-210F of decentralized P2P network 270 for executing the smart contract corresponding to smart contract operation network function request 290. Smart contract operation network function request 290 may further include the public key associated with the smart contract. Processors of lightweight node computing device 250B may execute digital signature algorithms to digitally sign smart contract operation network function request 290 with the private key associated with the wallet of lightweight node computing device 250B.

At decentralized P2P network 270, smart contract operation network function request 290 may be broadcasted to each of full node computing devices 210A-210F through execution of network protocols by full node computing devices 210A-210F. In order to execute smart contract operation network function request 290 and maintain internodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250B. Processors, ASIC devices, and/or GPUs of full node computing devices 210A-210F may execute hash functions to generate a digest of smart contract operation network function request 290. The resultant digest of smart contract operation network function request 290, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of smart contract operation network function request 290 and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines smart contract operation network function request 290, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may, per the network protocols, increase a balance sheet holdings amount associated with itself by a predetermined amount. In some arrangements, each of full node computing devices 210A-210F may receive an equal portion of the data transfer amount specified by lightweight node computing device 250B for executing smart contract operation network function request 290. After the new block has been added to blockchain 226, smart contract operation request 290 may be considered to be executed and the data transfer from the wallet associated with lightweight node computing device 250B to the public key associated with the smart contract may be registered.

The smart contract may be configured to hold the data transfer from the wallet associated with lightweight node computing device 250B until fulfillment of certain predetermined criteria hardcoded into the smart contract are achieved. The smart contract may be configured such that it serves as an intermediate arbiter between entities within the decentralized P2P network 270 and may specify details of a dual data transfer between entities.

For example, the smart contract corresponding to smart contract operation request 290 may be one or more algorithms and/or programs stored on a block of blockchain 226. The smart contract may be identified by one or more wallets and/or public keys within decentralized P2P network 270. Lightweight node computing device 250B may transmit smart contract operation network function request 290 to decentralized P2P network 270, which may cause execution of the corresponding smart contract that facilitates a dual data transfer between a wallet associated with lightweight node computing device 250B and a wallet associated with another node in decentralized P2P network 270, such as lightweight node computing device 250A, based on fulfillment of programmatic conditions established by the smart contract. In the processes of adding the block comprising smart contract operation request 290 to blockchain 226, each of full node computing devices 210A-210F may identify the block within blockchain 226 comprising the smart contract, associate the data transfer entailed by smart contract operation request 290 with the smart contract, and execute the one or more algorithms and/or programs of the smart contract. In this instance, given that the smart contract facilitates a dual data transfer and that data transfer has yet to be received from another node (e.g., lightweight node computing device 250A), each of full node computing devices 210A-210F may execute the smart contract without fulfillment of the programmatic conditions established by the smart contract. Accordingly, the funds transferred by lightweight node computing device 250B may remain in the smart contract until the data transfer from the other node is also associated with the smart contract.

Moving forward, lightweight node computing device 250A may also request a smart contract operation related to decentralized P2P network 270, which may conclude the dual data transfer between the wallet associated lightweight node computing device 250A and the wallet associated with lightweight node computing device 250B. Processors of lightweight node computing device 250A may execute network commands to broadcast the smart contract operation network function request to decentralized P2P network 270. The smart contract operation network function request may include details about the data transfer such as data type and amount, as well as a data transfer amount to full node computing devices 210A-210F of decentralized P2P network 270 for executing the smart contract corresponding to the smart contract operation network function request. The smart contract operation network function request may further include the public key associated with the smart contract. Processors of lightweight node computing device 250A may execute digital signature algorithms to digitally sign the smart contract operation network function request with the private key associated with the wallet of lightweight node computing device 250A.

At decentralized P2P network 270, the smart contract operation network function request may be broadcasted to each of full node computing devices 210A-210F through execution of network protocols by full node computing devices 210A-210F. In order to execute the smart contract operation network function request and maintain inter-nodal agreement as to the state of blockchain 226, processors, ASIC devices, and/or GPUs of full node computing devices 210A-210F may execute network protocols to receive broadcast of the network function through a decentralized P2P network 270 and from lightweight node computing device 250A. Processors, ASIC devices, and/or GPUs of full node computing devices 210A-210F may execute hash functions to generate a digest of the smart contract operation network function request. The resultant digest of the smart contract operation network function request, in turn, may be hashed with the block hash of the most immediately preceding block of blockchain 226. Processors, ASIC devices, and/or GPUs of full node computing devices 210A-210F may execute consensus algorithms to identify a nonce corresponding to the particular executed consensus algorithm and related to the digest that combines the digest of the smart contract operation network function request and the block hash of the most immediately preceding block of blockchain 226.

The identification of the nonce enables processors, ASIC devices, and/or GPUs of the full node computing device from full node computing devices 210A-210F to create a new block with a block header (e.g., block hash), which is a digest that combines the smart contract operation network function request, the block hash of the most immediately preceding block, and the identified nonce. Processors, ASIC devices, and/or GPUs of the full node computing device from full node computing devices 210A-210F may execute network protocols to add the new block to blockchain 226 and broadcast the new block to the other full node computing devices in the decentralized P2P network 270. In some arrangements, the new block may also be time-stamped at a time corresponding to the addition to blockchain 226. Furthermore, as a reward for adding the new block to blockchain 226, the full node computing device from full node computing devices 210A-210F may be allowed, per the network protocols, to increase a balance sheet holdings amount associated with itself by a predetermined amount. In some arrangements, each of full node computing devices 210A-210F may receive an equal portion of the data transfer amount specified by lightweight node computing device 250A for executing the smart contract operation network function request. After the new block has been added to blockchain 226, the smart contract operation transaction network function request 290 may be considered to be executed and the data transfer from the wallet associated with lightweight node computing device 250A to the public key associated with the smart contract may be registered.

When the smart contract receives the data value from each of lightweight node computing device 250A and lightweight node computing device 250B, the execution of the smart contract by each of full node computing devices 210A-210F may cause transfer of the data value from lightweight node computing device 250A to lightweight node computing device 250B and the data value from lightweight node computing device 250B to lightweight node computing device 250A.

For example, lightweight node computing device 250A may transmit the smart contract operation network function request to decentralized P2P network 270, which may cause execution of the corresponding smart contract that facilitates the dual data transfer. In the process of adding the block comprising the smart contract operation request provided by lightweight node computing device 250A to blockchain 226, each of full node computing devices 210A-210F may identify the block within blockchain 226 comprising the smart contract, associate the data transfer entailed by smart contract operation request of lightweight node computing device 250A with the smart contract, and execute the one or more algorithms and/or programs of the smart contract. In this instance, given that the smart contract facilitates a dual data transfer and that data transfers have been received from lightweight node computing device 250A and lightweight node computing device 250B, each of full node computing devices 210A-210F may execute the smart contract as fulfillment of the programmatic conditions established by the smart contract has occurred. Accordingly, the funds allocated to the smart contract by each of lightweight node computing device 250A and lightweight node computing device 250B may be respectively distributed to the intended counterparty.

While the description provided above was made in relation to lightweight node computing device 250A and lightweight node computing device 250B, it should be understood that any of the full node computing devices and lightweight node computing devices in decentralized system 200 may participate in the smart contract. Furthermore, it should be understood that the smart contract may be able to fulfill dual data transfers in the manner described above across a plurality of entities entering into the smart contract. For example, a first plurality of entities may enter into the smart contract, which may hold the data values for each of the first plurality of entities until a second plurality of entities enter into the smart contract. When each of the first plurality of entities and the second plurality of entities have entered, the smart contract may perform the data transfer. Other smart contracts may be included which include algorithms, programs, and/or computer-executable instructions which cause the performance of one or more functions related to at least cryptocurrency, digital content storage and delivery, entity authentication and authorization, digital identity, marketplace creation and operation, internet of things (e.g., IoT), prediction platforms, election voting, medical records, currency exchange and remittance, P2P transfers, ride sharing, gaming, trading platforms, and real estate, precious metal, and work of art registration and transference.

In comparison to the centralized computing system 100 described in regard to FIG. 1, decentralized P2P computer system 200 may provide technological advantages. For example, by distributing storage of blockchain 226 across multiple full node computing devices 210A-210F, decentralized P2P computer system 200 may not provide a single point of failure for malicious attack. In the event that any of the full node computing devices 210A-210F are compromised by a malicious attacker, decentralized P2P computer system 200 may continue to operate unabated as data storage of blockchain 226 and performance of network processes are not controlled by a singular entity such as server infrastructure 110 of centralized computing system 100.

Furthermore, by utilizing blockchain data structure 226, decentralized P2P system 200 may provide technological improvements to conventional decentralized P2P systems in regard to byzantine fault tolerance stemming from an unreliable and/or malicious full node acting in decentralized P2P network 270 to undermine the work efforts of the other nodes. For example, in coordinating action between full node computing devices 210A-210F in relation to a similar computational task (e.g., consensus algorithm), a malicious node would need to have computational power greater than the combined computational power of each of the other full node computing devices in decentralized P2P network 270 to identify the nonce and thereby be able to modify blockchain 226. As such, the likelihood that a malicious node could subvert decentralized P2P network 270 and enter falsified data into blockchain 226 is inversely proportional to the total computational power of decentralized P2P system 200. Therefore, the greater the total computational power of decentralized P2P system 200, the less likely that a malicious node could subvert decentralized P2P network 270 and undermine blockchain 226.

Figures 3A, 3B:
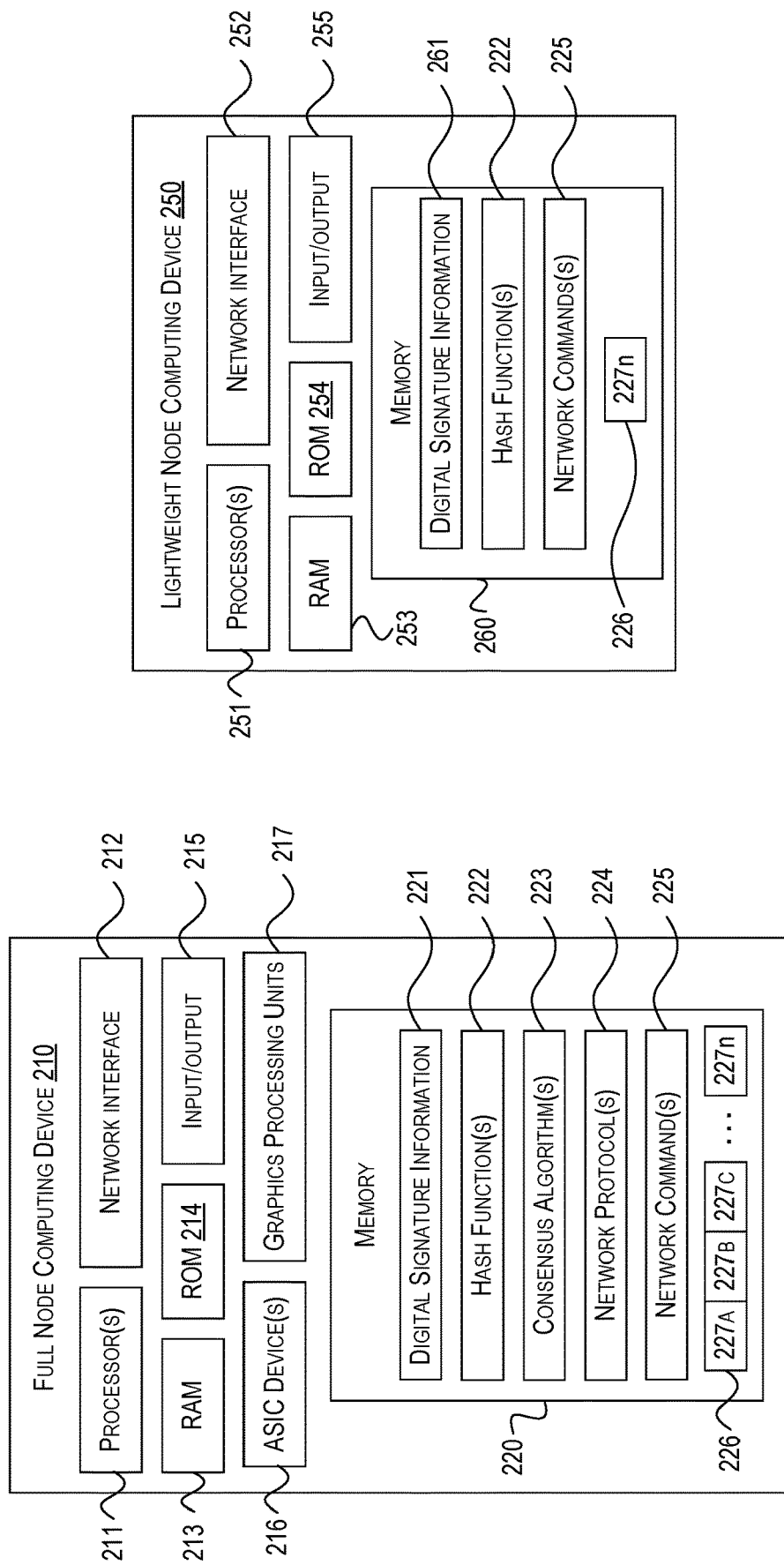
FIG. 3A depicts an illustrative full node computing device that may be used in accordance with one or more example embodiments described herein.
FIG. 3B depicts an illustrative lightweight node computing device that may be used in accordance with one or more example embodiments described herein.

FIG. 3A depicts an illustrative example of a full node computing device 210 that may be used in accordance with one or more illustrative aspects described herein. Full node computing device 210 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, full node computing device 210 may be configured to operate in a decentralized P2P network and may request execution of network functions and/or execute requested network functions and maintain inter-nodal agreement as to the state of a blockchain of the decentralized P2P network.

Full node computing device 210 may include one or more processors 211, which control overall operation, at least in part, of full node computing device 210. Full node computing device 210 may further include random access memory (RAM) 213, read only memory (ROM) 214, network interface 212, input/output interfaces 215 (e.g., keyboard, mouse, display, printer, etc.), and memory 220. Input/output (I/O) 215 may include a variety of interface units and drives for reading, writing, displaying, and/or printing data or files. In some arrangements, full node computing device 210 may further comprise specialized hardware components such as application-specific integrated circuit (e.g., ASIC) devices 216 and/or graphics processing units (e.g., GPUs) 217. Such specialized hardware components may be used by full node computing device 210 in performing one or more of the processes involved in the execution of requested network functions and maintenance of inter-nodal agreement as to the state of a blockchain. Full node computing device 210 may further store in memory 220 operating system software for controlling overall operation of the full node computing device 210, control logic for instructing full node computing device 210 to perform aspects described herein, and other application software providing secondary, support, and/or other functionality which may or might not be used in conjunction with aspects described herein.

Memory 220 may also store data and/or computer executable instructions used in performance of one or more aspects described herein. For example, memory 220 may store digital signature information 221 and one or more hash functions 222, consensus algorithms 223, network protocols 224, and network commands 225. In some arrangements, digital signature information 221, hash functions 222, and/or network commands 225 may comprise a wallet of full node computing device 210. Memory 220 may further store blockchain 226. Each of digital signature information 221, hash functions 222, consensus algorithms 223, network protocols 224, and network commands 225 may be used and/or executed by one or more processors 211, ASIC devices 216, and/or GPUs 217 of full node computing device 210 to create and maintain a decentralized P2P network, request execution of network functions, and/or execute requested network functions and maintain inter-nodal agreement as to the state of blockchain 226.

For example, in order to create and maintain a decentralized P2P network, processors 211, ASIC devices 216, and/or GPUs 217 of full node computing device 210 may execute network protocols 225. Execution of network protocols 225 may cause full node computing device 210 to form a communicative arrangement with other full node computing devices and thereby create a decentralized P2P network. Furthermore, the execution of network protocols 225 may cause full node computing device 210 to maintain the decentralized P2P network through the performance of computational tasks related to the execution of network requests related to a blockchain such as blockchain 226. As will be described in detail below, the execution of such computational tasks (e.g., hash functions 222, consensus algorithms 223, and the like) may cause full node computing device 210 to maintain inter-nodal agreement as to the state of a blockchain with other full node computing devices comprising the decentralized P2P network.

In order to request execution of network functions, such as balance sheet transactions and/or smart contract operations, processors 211, ASIC devices 216, and/or GPUs 217 of full node computing device 210 may execute network commands 225 to broadcast the network function to a decentralized P2P network comprising a plurality of full nodes and/or lightweight nodes. The request may be digitally signed by full node computing device 210 with usage of the private/public key information and through execution of the digital signature algorithms of digital signature information 221.

In order to execute requested network functions and maintain inter-nodal agreement as to the state of a blockchain, processors 211, ASIC devices 216, and/or GPUs 217 of full node computing device 210 may execute network protocols 224 to receive a broadcast of a requested network function through a decentralized P2P network and from a requesting entity such as a full node or lightweight node. Processors 211, ASIC devices 216, and/or GPUs 217 of full node computing device 210 may execute hash functions 222 to generate a digest of the requested network function. The resultant digest of the requested network function, in turn, may be hashed with the block hash of the most immediately preceding block of the blockchain. As will be described in further detail below, processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the digest of the requested network function and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the digest of the requested network function, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

As stated above, in some arrangements, a plurality of network function requests may be broadcasted across the decentralized network P2P network. Processors 211, ASIC devices 216, and/or GPUs 217 of full node computing device 210 may execute network protocols 224 to receive broadcast of each of the network functions through the decentralized P2P network and from the requesting entities. Processors 211, ASIC devices 216, and/or GPUs 217 of full node computing device 210 may execute hash functions 222 to generate a hash tree (e.g., Merkle tree) of the requested network functions, which culminates in a single digest (e.g., root digest, root hash, and the like) that comprises the digests of each of the requested network functions. The root digest of the requested network function, in turn, may be hashed with the block hash of the most immediately preceding block of the blockchain. Processors 211, ASIC devices 216, and/or GPUs 217 of full node computing device 210 may execute consensus algorithms 223 to identify a numerical value (e.g., nonce) corresponding to the particular executed consensus algorithm and related to the digest that combines the root digest of the requested network functions and the block hash of the most immediately preceding block of the blockchain. The identification of the numerical value enables processors 211, ASIC devices 216, and/or GPUs 217 of full node computing device 210 to create a new block with a block header (e.g., block hash), which is a digest that combines the root digest of the requested network functions, the block hash of the most immediately preceding block, and the identified nonce. Processors 211, ASIC devices 216, and/or GPUs 217 of full node computing device 210 may add the new block to the blockchain based on network protocols 224 and broadcast the new block to the other nodes in the decentralized P2P network.

Furthermore, memory 220 of full node computing device 210 may store blockchain 226. Blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226, which may be a replica or copy of the blockchain of the decentralized P2P network in which full node computing device 210 operates, may be a full or complete copy of the blockchain of the decentralized P2P network. Each of the blocks within blockchain 226 may include information corresponding to the one or more network functions executed by the decentralized P2P network. As such, blockchain 226 as stored in memory 220 of full node computing device 210 may comprise the totality of network functions executed by the decentralized network.

FIG. 3B depicts an illustrative example of a lightweight node computing device 250 that may be used in accordance with one or more illustrative aspects described herein. Lightweight node computing device 250 may be any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like and may operate in a decentralized P2P network. In some embodiments, lightweight node computing device 250 may operate in a decentralized P2P network and may be configured to request execution of network functions through the decentralized P2P network. As such, lightweight node computing device 250 may be different than full node computing device 210 in that it is not configured to execute network functions and/or operate to maintain a blockchain of a decentralized P2P network. In other aspects, lightweight node computing device 250 may have substantially the same physical configuration as full node computing device 210, but may be configured with different programs, software, etc.

Lightweight node computing device 250 may include one or more processors 251, which control overall operation of lightweight node computing device 250. Lightweight node computing device 250 may further include random access memory (RAM) 253, read only memory (ROM) 254, network interface 252, input/output interfaces 255 (e.g., keyboard, mouse, display, printer, etc.), and memory 260. Input/output (I/O) 255 may include a variety of interface units and drives for reading, writing, displaying, and/or printing data or files. Lightweight node computing device 250 may store in memory 260 operating system software for controlling overall operation of the lightweight node computing device 250, control logic for instructing lightweight node computing device 250 to perform aspects described herein, and other application software providing support and/or other functionality which may or might not be used in conjunction with aspects described herein.

In comparison to full node computing device 210, lightweight node computing device 250 might not include, in some instances, specialized hardware such as ASIC devices 216 and/or GPUs 217. Such may be the case because lightweight node computing device 250 might not be configured to execute network functions and/or operate to maintain a blockchain of a decentralized P2P network as is full node computing device 210. However, in certain arrangements, lightweight node computing device 250 may include such specialized hardware.

Memory 260 of lightweight node computing device 250 may also store data and/or computer executable instructions used in performance of one or more aspects described herein. For example, memory 260 may store digital signature information 261 and one or more hash functions 222 and network commands 225. In some arrangements, digital signature information 261, hash functions 222, and/or network commands 225 may comprise a wallet of lightweight node computing device 250. Each of hash functions 222 and network commands 225 stored in memory 260 of lightweight node computing device 250 may be respectively similar and/or identical to hash functions 222 network commands 225 stored in memory 220 of full node computing device 210.

In regard to the digital signature information, each of digital signature information 261 stored in memory 260 of lightweight node computing device 250 and digital signature information 221 stored in memory 220 of full node computing device 210 may comprise similar and/or identical digital signature algorithms. However, the private/public key information of digital signature information 261 stored in memory 260 of lightweight node computing device 250 may be different than that of the private/public key information of digital signature information 221 stored in memory 220 of full node computing device 210. Furthermore, the private/public key information of each node, whether full or lightweight, in a decentralized P2P computing network may be unique to that particular node. For example, a first node in a decentralized P2P computing network may have first private/public key information, a second node may have second private/public key information, a third node may have third private/public key information, and so on, wherein each of the private/public key information is unique to the particular node. As such, the private/public key information may serve as a unique identifier for the nodes in a decentralized P2P computing network.

Each of digital signature information 261, hash functions 222, and network commands 225 may be used and/or executed by one or more processors 251 of lightweight node computing device 250 to request execution of network functions in a decentralized P2P network. For example, in order to request execution of network functions, such as balance sheet transactions and/or smart contract operations, processors 251 of lightweight node computing device 250 may execute network commands 225 to broadcast the network function to a decentralized P2P network comprising a plurality of full nodes and/or lightweight nodes. The request may be digitally signed by lightweight node computing device 250 with usage of the private/public key information and through execution of the digital signature algorithms of digital signature information 261.

Furthermore, memory 260 of lightweight node computing device 250 may store blockchain 226. Blockchain 226 stored in memory 260 of lightweight node computing device 250 may include at least block 227n, wherein block 227n represents the most immediate block of blockchain 226. As such, the blockchain 226, which may be a replica or copy of the blockchain of the decentralized P2P network in which lightweight node computing device 250 operates, may be a partial or incomplete copy of the blockchain of the decentralized P2P network. In some instances, however, blockchain 226 may include a blocks 227A, 227B, 227C, . . . 227n, wherein block 227A represents the first block (e.g., genesis block) of blockchain 226 and block 227n represents the most immediate block of blockchain 226. As such, the blockchain 226 may be a full or complete copy of the blockchain of the decentralized P2P network. Each of the blocks within blockchain 226 may include information corresponding to the one or more network functions executed by the decentralized P2P network.

Blockchain-Based Automated User Matching

Figure 4A:
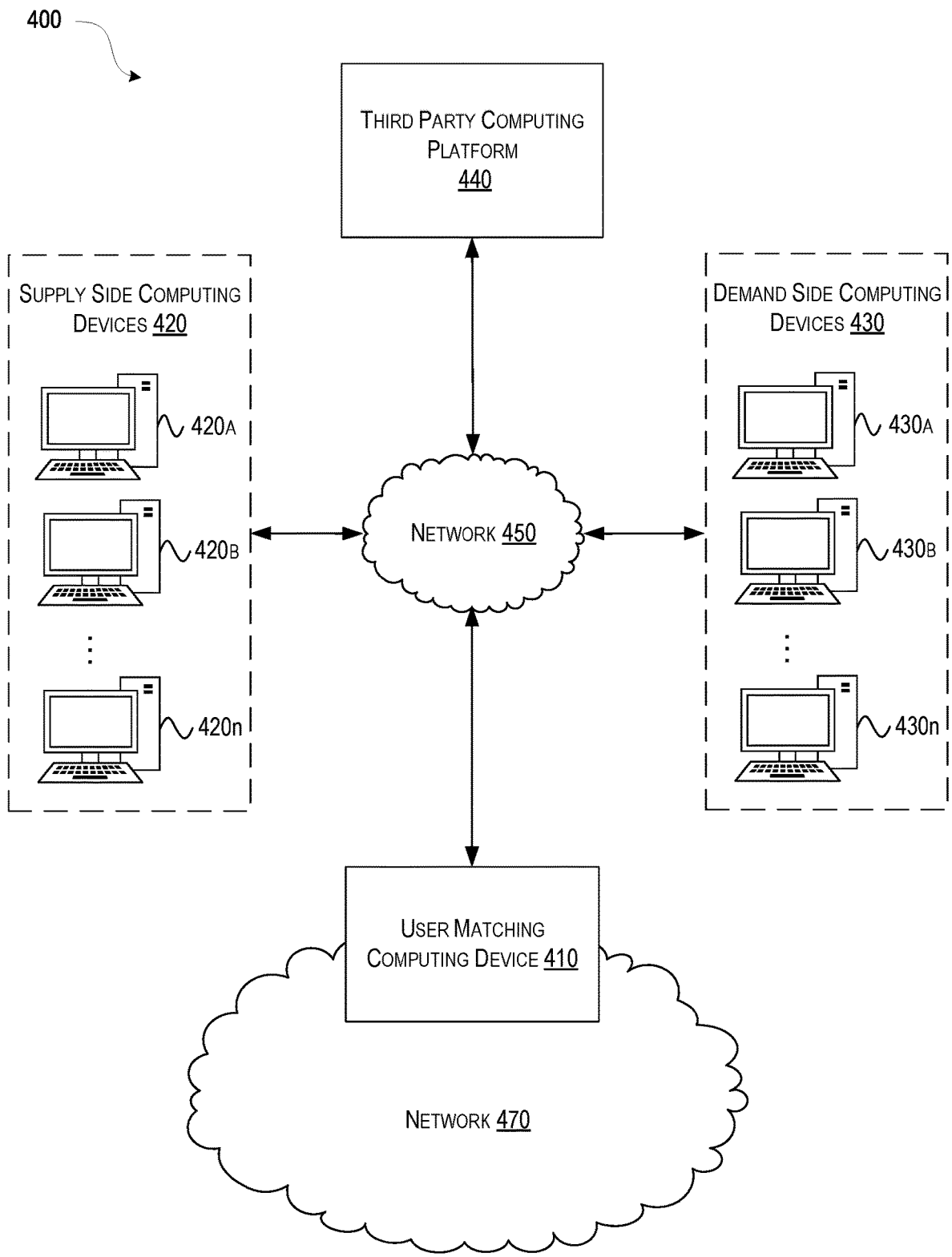
FIG. 4A depicts an illustrative automated user matching system that may be used in accordance with one or more example embodiments described herein.

FIG. 4A depicts an illustrative automated user matching system 400 that may be used in accordance with one or more example embodiments described herein. Referring to FIG. 4A, automated user matching system 400 may include at least user matching computing device 410, supply side computing devices 420 (e.g., supply side computing devices 420A, 420B, . . . 420n), demand side computing devices 430 (e.g., demand side computing devices 430A, 430B, . . . 430n), and third party computing platform 440. User matching computing device 410 may be configured to operate in decentralized P2P network 470 as a full node and/or a lightweight node. User matching computing device 410, supply side computing devices 420, demand side computing devices 430, and/or third party computing platform 440 may be configured to communicate through network 450, and/or one or more other networks. In some instances, automated user matching system 400 may include additional computing devices similar to user matching computing device 410, supply side computing devices 420, demand side computing devices 430, and/or third party computing platform 440. Such additional computing devices may be configured to communicate with user matching computing device 410, supply side computing devices 420, demand side computing devices 430, and/or third party computing platform 440 through network 450 and/or one or more other networks.

User matching computing device 410 may be associated with a particular entity, such as a financial institution, and may be configured to interface with supply side computing devices 420, demand side computing devices 430, and/or third party computing platform 440 through network 450 and/or one or more other networks. In particular, user matching computing device may be able to transmit and receive information with supply side computing devices 420 including at least one or more supply side match parameters, demand side computing devices 430 including at least one or more demand side match parameters, and third party computing platform 440 including at least credit data related to entities and/or users associated with the supply side computing devices 420 and/or demand side computing devices 430. Furthermore, user matching computing device 410 may be configured to operate in decentralized P2P network 470 as a full node and/or a lightweight node.

In arrangements in which user matching computing device 410 operates as a full node in decentralized P2P network 470, user matching computing device 410 may be similar to full node computing devices 210A-210F described above in regard to FIG. 2, as well as full node computing device 210 described above in regard to FIG. 3A. As such, user matching computing device 410 may be configured to execute requested network functions, maintain inter-nodal agreement as to the state of a blockchain of decentralized P2P network 470, and request execution of network functions. Such network functions may include data storage operations and/or smart contract operations, which may be related to facilitating the blockchain-based automated user matching processes described in further detail below.

In arrangements in which user matching computing device 410 operates as a lightweight node on decentralized P2P network 470, user matching computing device 410 may be similar to lightweight node computing devices 250A and 250B described above in regard to FIG. 2, as well as lightweight node computing device 250 described above in regard to FIG. 3B. As a lightweight node computing device, user matching computing device 410 may be configured to interface with decentralized P2P network 470 by requesting execution of network functions related to facilitating the blockchain-based automated user matching processes described herein.

Supply side computing devices 420 may be associated with a plurality of entities, such as one or more financial lending institutions and/or insurance providers, and may include supply side computing devices 420A, 420B, . . . 420n which may be respectively associated with a particular entity, such as a particular financial lending institution and/or a particular insurance provider. Supply side computing devices 420 may include any of personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), virtualized computing environment(s), and the like. Each of supply side computing devices 420A-420n may be able to communicate with user matching computing device 410, demand side computing devices 430, and third party computing platform 440 through network 450 and/or one or more other networks.

Supply side computing devices 420 may interface with user matching computing device 410 through a supply side UI provided by user matching computing device 410. Supply side computing devices 420 may be configured to transmit information to and receive information from user matching computing device 410 through the supply side UI. Such data may include at least one or more supply side match parameters. For example, in regard to arrangements in which supply side computing devices 420 are associated with financial lending institutions, the one or more supply side match parameters may include one or more of a lending amount, interest rate, and/or lender credit rating. In some instances, however, user matching computing device 410 may be configured to monitor real-time changes in interest rates and supply side computing devices 420 may not need to provide such data. In regard to arrangements in which supply side computing devices 420 are associated with insurance providers, the one or more supply side match parameters may include one or more of a coverage amount, deductible, and/or premium.

Demand side computing devices 430 may be associated with a plurality of customers requiring services from financial lending institutions and/or insurance providers and may include demand side computing devices 430A, 430B, . . . 430n which may be respectively associated with a particular customer requiring services. Demand side computing devices may include any of personal computer(s), server computer(s), hand-held or laptop device(s), multiprocessor system(s), microprocessor-based system(s), set top box(es), programmable consumer electronic device(s), network personal computer(s) (PC), minicomputer(s), mainframe computer(s), distributed computing environment(s), virtual computing environment(s), and the like. Each of demand side computing devices 430A-430n may be able to communicate with user matching computing device 410, supply side computing devices 420, and third party computing platform 440 through network 450 and/or one or more other networks.

Demand side computing devices 430 may interface with user matching computing device 410 through a demand side UI provided by user matching computing device 410. Demand side computing devices 430 may be configured to transmit information to and receive information from user matching computing device 410 through the demand side UI. Such data may include at least one or more demand side match parameters. For example, in regard to arrangements in which demand side computing devices 430 are associated with users requiring services from financial lending institutions, the one or more demand side match parameters may include one or more of a desired lending amount, desired interest rate, and/or borrower credit rating. In regard to arrangements in which demand side computing devices 430 are associated with users requiring services from insurance providers, the one or more demand side match parameters may include one or more of a desired coverage amount, desired deductible, and/or desired premium.

Third party computing platform 440 may be store data related to lender credit ratings associated with financial lending institutions corresponding to supply side computing devices 420A-420n and borrower credit ratings associated with users corresponding to demand side computing devices 430A-430n. Third party computing platform 440 may include any of a personal computer, server computer, hand-held or laptop device, multiprocessor system, microprocessor-based system, set top box, programmable consumer electronic device, network personal computer, minicomputer, mainframe computer, distributed computing environment, virtual computing device, and the like. Third party computing platform 440 may be able to communicate with user matching computing device 410, supply side computing devices 420, and/or demand side computing devices 430 through network 450 and/or one or more other networks.

Third party computing platform 440 may be configured to transmit information to and receive information from user matching computing device 410 related to lender credit ratings associated with financial lending institutions corresponding to supply side computing devices 420A-420n and borrower credit ratings associated with users corresponding to demand side computing devices 430A-430n. In some instances described in further detail below, the lender and borrower credit rating data supplied by third party computing platform 440 may be used by user matching computing device 410 and/or one or more smart contracts stored in a blockchain of decentralized P2P network 470 in facilitating matching between the financial lending institutions and users requiring services from the financial lending institutions.

As stated above, automated user matching system 400 may further include decentralized P2P network 470 in which user matching computing device 410 may be configured to operate as a node. Decentralized P2P network 470 may be similar to decentralized P2P network 270 described above in regard to FIG. 2. As such, decentralized P2P network 470 may be formed by a plurality of full node computing devices executing network protocols associated with decentralized network 470. Furthermore, network functions performed by decentralized network 470 may be configured to be stored by the full node computing devices of decentralized P2P network 470 on a blockchain associated with decentralized P2P network 470.

Additionally, automated user matching system 400 may also include one or more networks, which may interconnect one or more of user matching computing device 410, supply side computing devices 420, demand side computing devices 430, and/or third party computing platform 440. For example, automated user matching system 400 may include network 450. Network 450 may include one or more sub-networks (e.g., local area networks (LANs), wide area networks (WANs), or the like). Each of user matching computing device 410, supply side computing devices 420, demand side computing devices 430, third party computing platform 440, and/or other computing devices of automated user matching system 400 may be configured to communicate through network 450.

Figure 4B:
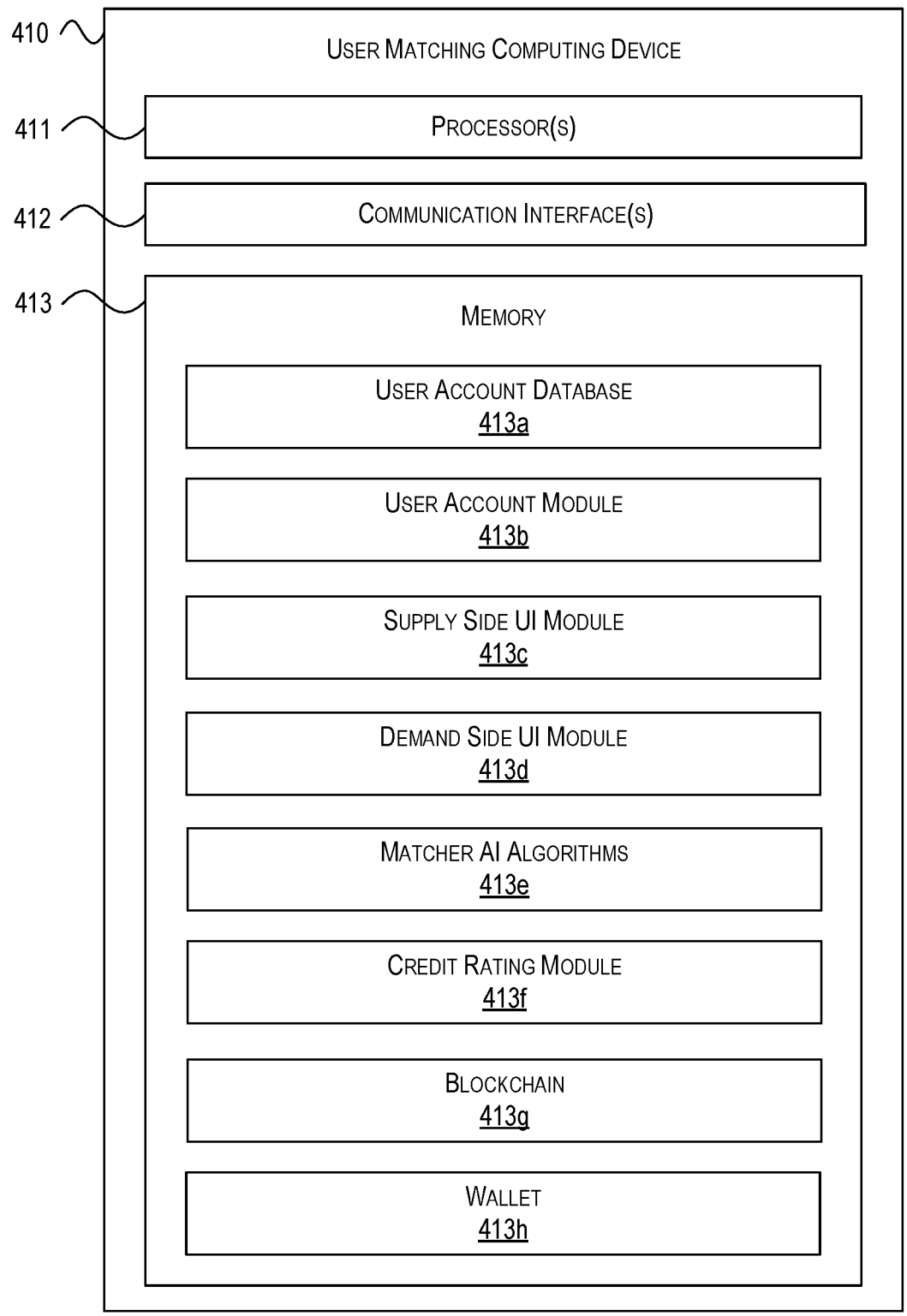
FIG. 4B depicts an illustrative user matching computing device that may be used in accordance with one or more example embodiments described herein.

FIG. 4B depicts an illustrative user matching computing device 410 that may be used in accordance with one or more example embodiments described herein. Referring to FIG. 4B, user matching computing device 410 may include processor(s) 411, communication interface(s) 412, and memory 413. A data bus may interconnect processor(s) 411, communication interface(s) 412, and memory 413. Communication interface(s) 412 may be one or more network interfaces configured to support communication between user matching computing device 410 and one or more networks (e.g., network 450, decentralized P2P network 470, and the like). In arrangements in which user matching computing device 410 is configured to operate in decentralized P2P 470 as a full node computing device, user matching computing device 410 may additionally include the hardware and/or software components of full node computing device 210 described in regard to FIG. 3A. Furthermore, in arrangements in which user matching computing device 410 is configured to operate in decentralized P2P network 470 as a lightweight node computing device, user matching computing device 410 may additionally include the hardware and/or software components of lightweight node computing device 250 described above in regard to FIG. 3B and/or the hardware and/or software components of full node computing device 210 described in regard to FIG. 3A.

Memory 413 may include one or more program modules having instructions that, when executed by processor(s) 411, cause user matching computing device 410 to perform one or more functions described herein and/or otherwise maintain information in one or more databases which may be used by such program modules and/or processor(s) 411. In some instances, the one or more program modules and/or databases may be stored by and/or maintained in different memory units of user matching computing device 410. For example, memory 413 may have, store, and/or include a user account database 413a, user account module 413b, supply side UI module 413c, demand side module 413d, matcher AI module 413e, credit score module 413f, blockchain 413g, and wallet 413h.

User account database 413a may store information corresponding to financial lending institutions and/or insurance providers related to supply side computing devices 420 and/or users requiring services from the financial lending institutions and/or insurance providers related to demand side computing devices 430. For example, user account database 413a may store the one or more supply side match parameters, the one or more demand side match parameters, match data interlinking the supply side users and the demand side users, as well as other data such as data related to lender credit ratings associated with financial lending institutions corresponding to supply side computing devices 420A-420n and borrower credit ratings associated with users corresponding to demand side computing devices 430A-430n. In some instances, such data may be stored in user profiles corresponding to the financial lending institutions and/or insurance providers related to supply side computing devices 420 and users requiring services from the financial lending institutions and/or insurance providers related to demand side computing devices 430. Additional information discussed herein may be stored in user account database 413a.

User account module 413b may have instructions that direct and/or cause user matching computing device 410 to generate user accounts for financial lending institutions and/or insurance providers related to supply side computing devices 420 and users requiring services from the financial lending institutions and/or insurance providers related to demand side computing devices 430. In some instances, user account module 413b may cause user matching computing device 410 to process user account information received through supply side UI module 413c and/or demand side UI module 413d in generating user accounts. Furthermore, user account module 413b may enable user matching computing device 410 to maintain the user accounts stored in user account database 413a. Additionally, user account module 413b may perform other functions, as discussed in greater detail below.

Supply side UI module 413c may have instructions that direct and/or cause user matching computing device 410 to create a user interface through which supply side computing devices 420 may transmit and receive information related to user account creation, match requests, match arrangements, match updates, and the like. Similarly, demand side UI module 413d may have instructions that direct and/or cause user matching computing device 410 to create a user interface through which demand side computing devices 430 may transmit and receive information related to user account creation, match requests, match arrangements, match updates, and the like.

Matcher AI algorithms 413e may have instructions that direct and/or cause user matching computing device 410 to perform automated matching of one or more financial lending institutions and/or insurance providers with one or more users requiring services provided by the one or more financial lending institutions and/or insurance providers. In particular, matcher AI algorithms 413e may interlink, in an automated manner, the one or more supply side match parameters provided by one or more financial lending institutions and/or insurance providers with the one or more demand side match parameters provided by the one or more users requiring services provided by the one or more financial lending institutions and/or insurance providers.

For instance, in a first illustrative example, matcher AI algorithms 413e may link, in an automated manner, supply side match parameters including a $10,000 lending amount at 5% interest associated with a first financial lending institution corresponding to a first supply side computing device of supply side computing devices 420 with demand side match parameters including a $10,000 requested and/or desired lending amount at 5% requested and/or desired interest rate associated with a first user corresponding to a first demand side computing device of demand side computing devices 430. In a second illustrative example, matcher AI algorithms 413e may link supply side match parameters including a $20,000 lending amount at 3% interest associated with a second financial lending institution corresponding to a second supply side computing device of supply side computing devices 420 with demand side match parameters including a $10,000 requested lending amount at 3% requested interest associated with a second user corresponding to a second demand side computing device of demand side computing devices 430 and demand side match parameters including a $10,000 requested lending amount at 3% requested interest associated with a third user corresponding to a third demand side computing device of demand side computing devices 430. In a third illustrative example, matcher AI algorithms 413e may link supply side match parameters including a $20,000 lending amount at 3% interest associated with a third financial lending institution corresponding to a third supply side computing device of supply side computing devices 420 and supply side match parameters including a $20,000 lending amount at 5% interest associated with a fourth financial lending institution corresponding to a fourth supply side computing device of supply side computing devices 420 with demand side match parameters including a $40,000 requested lending amount at 4% requested interest associated with a fourth user corresponding to a fourth demand side computing device of demand side computing devices 430.

In some instances, matcher AI algorithms 413e may further incorporate lender credit ratings and borrower credit ratings during performance of automated matching of the one or more financial lending institutions and/or insurance providers with the one or more users requiring services provided by the one or more financial lending institutions and/or insurance providers. In such instances, a financial institution and/or insurance provider may be able to specify through supply side UI module 413c a borrower credit rating threshold and/or range, which may calibrate matcher AI algorithms 413e to exclude prospective borrowers below the borrower credit rating threshold and/or outside of the borrower credit range during match making. Similarly, a user requiring services provided by the one or more financial lending institutions and/or insurance providers may be able to specify through demand side UI module 413d a lender credit rating threshold and/or range, which may calibrate matcher AI algorithms 413e to exclude prospective lenders below the lender credit rating threshold and/or outside of the lender credit range during match making.

Matcher AI algorithms 413e may cause similar match processes to be performed with supply side match parameters provided by one or more insurance providers and demand side match parameters provided by one or more users requiring services from the one or more insurance providers. For example, supply side match parameters provided by the one or more insurance providers may include one or more of a coverage amount, deductible, and/or premium. Demand side match parameters provided by the one or more users requiring services from the one or more insurance providers may include desired coverage amount, desired deductible, and/or desired premium. Matcher AI algorithms 413e may cause matching of the one or more insurance providers with the one or more users requiring services provided by the one or more insurance providers based on a correlation of the supply side match parameters and the demand side match parameters.

Credit rating module 413f may have instructions that direct and/or cause user matching computing device 410 to calculate lender credit ratings associated with financial lending institutions and/or borrower credit ratings associated with users requiring services form the financial lending institutions. In some instances, credit rating module 413f may utilize data generated during the blockchain-based automated user matching processes described herein, as well as credit data provided by third party computing platform 440.

Blockchain 413g may be either a private or public blockchain which may store data and/or smart contracts of decentralized P2P network 470 related to the blockchain-based automated user matching processes described herein. In instances in which user matching computing device 410 is configured as a full node computing device in decentralized P2P network 470, blockchain 413g may be a complete replica or copy of the blockchain of decentralized P2P network 470. Alternatively, in instances in which user matching computing device 410 is configured as a lightweight node computing device in decentralized P2P network 470, blockchain 413g may be a partial replica or copy of the blockchain of decentralized P2P network 470.

Wallet 413g may store one or more data items and/or computer-executable instructions which cause user matching computing device 410 to interface with decentralized P2P network 470 in requesting performance of include data storage operations and/or smart contract operations. In particular, and as stated above, wallet 413h may include data items and/or computer-executable instructions including digital signature information, hash functions, network commands, and/or additional data items and/or computer-executable instructions.

FIGS. 5A-5L depict an illustrative event sequence for blockchain-based automated user matching in accordance with one or more example embodiments described herein. While the steps of the event sequence of FIGS. 5A-5L are described in a particular order, it should be understood that the steps may be performed in any order without departing from the scope of the disclosure provided herein. Furthermore, even though the event sequence is described as being performed by a particular arrangement of computing devices and computer networks (e.g., user matching computing device 410, supply side computing devices 420, demand side computing devices 430, third party computing platform 440, and decentralized P2P network 470), the processes may be performed by a number of computing devices and/or computing networks greater or less than that described in regard to FIGS. 5A-5L.

Figure 5A:
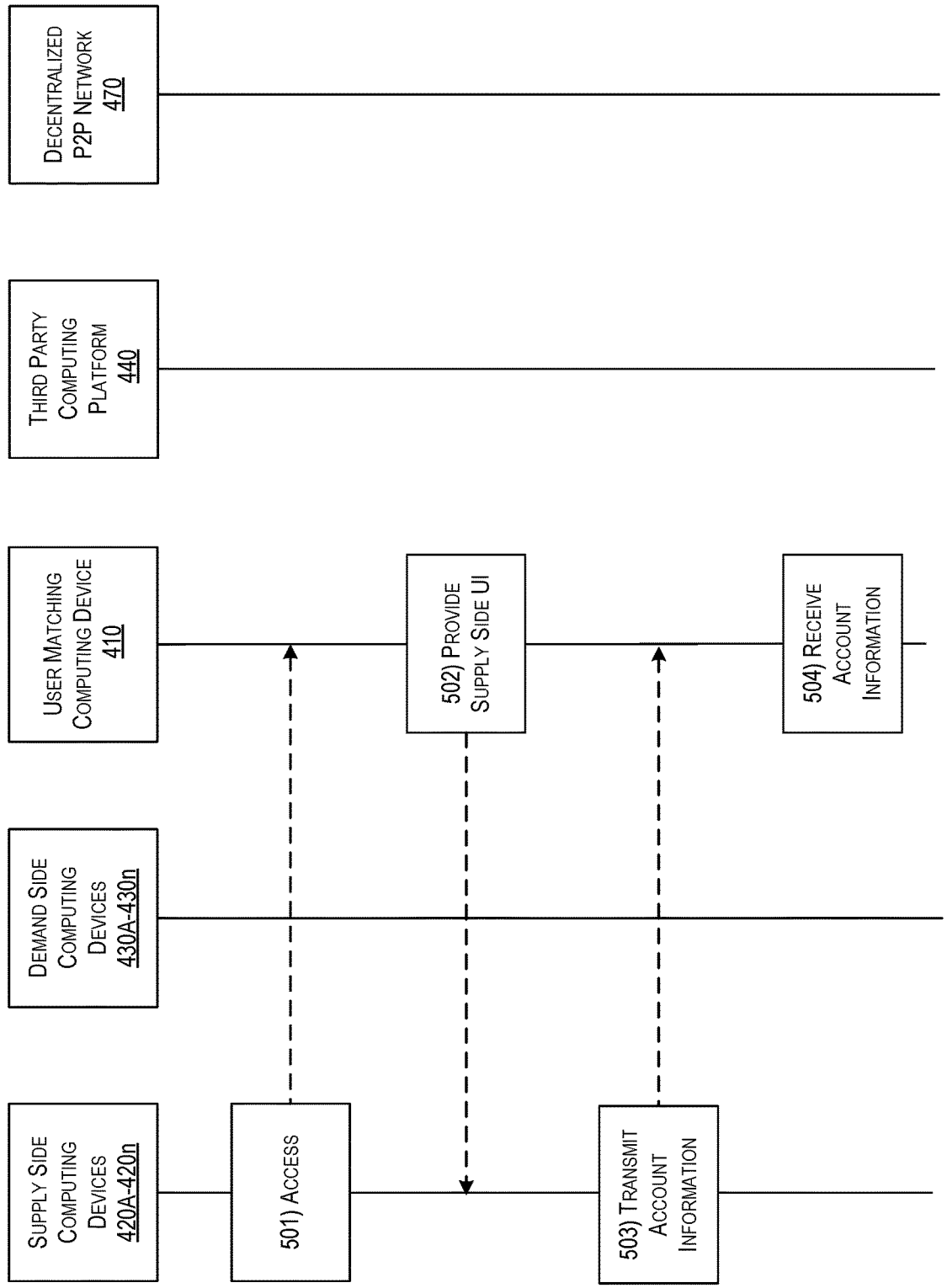

Referring to FIG. 5A, at step 501, one or more of supply side computing devices 420A-420n associated with one or more financial lending institutions and/or insurance providers may access user matching computing device 410. In some instances, the accessing of user matching computing device 410 may occur through a URL associated with user matching computing device 410. Additionally and/or alternatively, the accessing may occur through an application associated with user matching computing device 410 operating on the one or more of supply side computing devices 420A-420n.

At step 502, supply side UI module 413c may cause user matching computing device 410 to provide a supply side user interface to the one or more of supply side computing devices 420A-420n. In the event that the one or more financial lending institutions and/or insurance providers associated with the one or more supply side computing devices 420A-420n have not yet created user accounts with user matching computing device 410, supply side UI module 413c may cause user matching computing device 410 to provide a supply side user interface associated with facilitating account creation. Conversely, in the event that the one or more financial lending institutions and/or insurance providers associated with the one or more supply side computing devices 420A-420n have created user accounts with user matching computing device 410, supply side UI module 413c may cause user matching computing device 410 to provide a supply side user interface associated with facilitating automated user matching.

At step 503, in the event that the one or more financial lending institutions and/or insurance providers associated with the one or more supply side computing devices 420A-420n have not yet created user accounts with user matching computing device 410, the one or more of supply side computing devices 420A-420n may transmit account information to user matching computing device 410. The account information may be provided by a member and/or account administrator associated with the one or more financial lending institutions and/or insurance providers and the account information may include information corresponding to the financial lending institutions and/or insurance providers such as name, address, account name, password, lender credit rating, and so on. At step 504, user matching computing device 410 may receive the account information from the one or more of supply side computing devices 420A-420n.

Figure 5B:
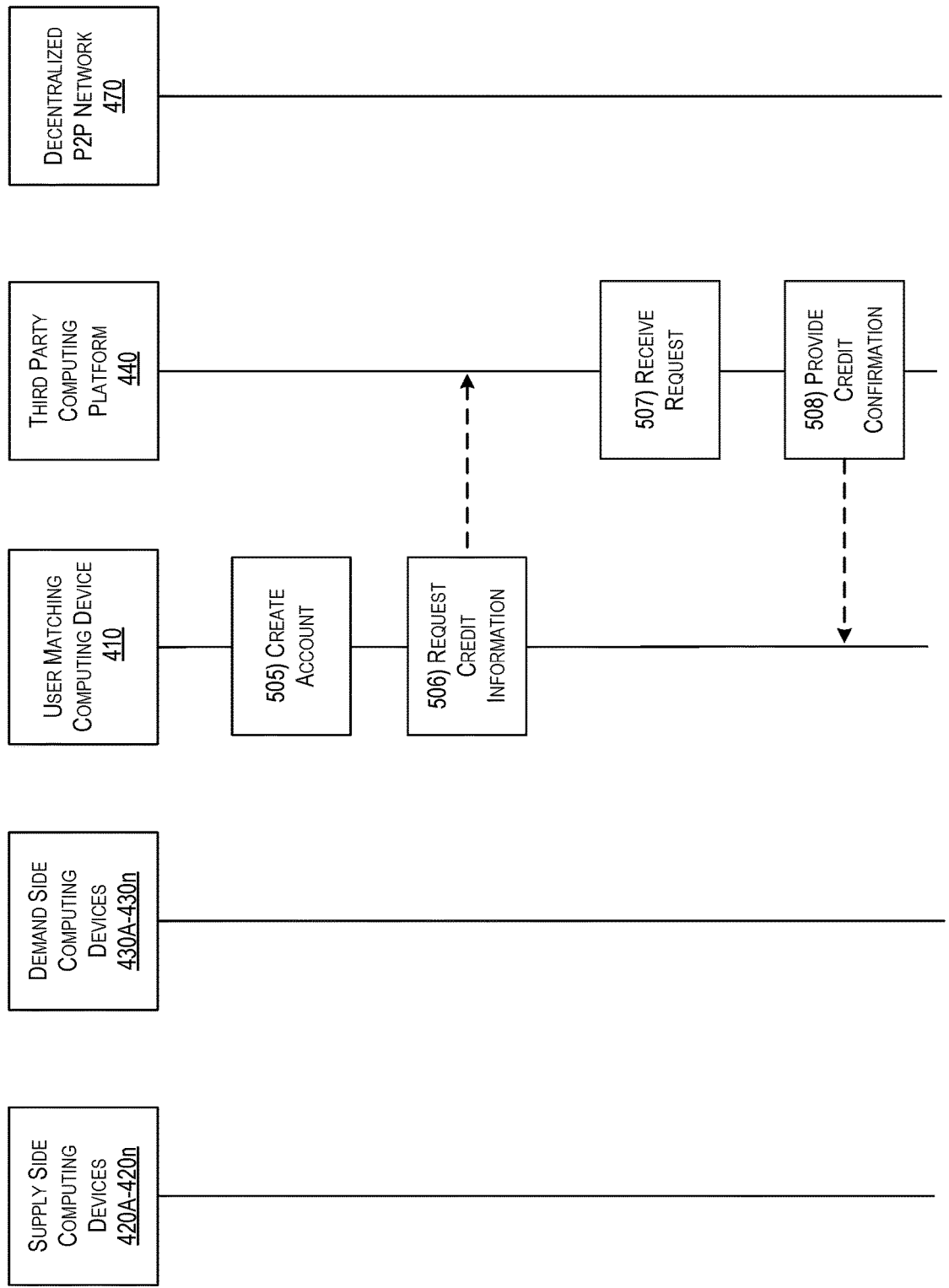

Referring to FIG. 5B, at step 505, user account module 413b may cause user matching computing device 410 to create one or more user accounts corresponding to the one or more financial lending institutions and/or insurance providers based on the account information received at step 504. The one or more user accounts may be created by user matching computing device 410 in user account database 413a. In creating the one or more user accounts corresponding to the one or more financial lending institutions and/or insurance, user matching computing devices 410 may generate a unique identifier for each of the one or more user accounts.

At step 506, credit rating module 413f may cause user matching computing device 410 to request credit information corresponding to the one or more financial lending institutions from third party computing platform 440. The request for credit information from third party computing platform 440 may also be performed with respect to insurance providers. In some instances, credit rating module 413f may also request information corresponding to the one or more financial lending institutions and/or insurance providers from a plurality of other third party computing platforms. The request may include information associated with the one or more financial lending institutions and/or credit providers including the name and address. In some instances, additional information may be included.

At step 507, third party computing platform 440 may receive the credit information request from user matching computing device 410. Third party computing platform 440 may query one or more local databases to identify credit information corresponding to the one or more financial lending institutions. In some instances, the credit information identified in the query may be related to the one or more financial lending institutions, but may be associated with one or more auxiliary and/or regulatory organizations tasked with monitoring lending habits of the one or more financial lending institutions. At step 508, third party computing platform 440 may provide the credit information identified for the one or more financial lending institutions to user matching computing device 410. Such processes may also be performed in regard to insurance providers.

Referring to FIG. 5C, at step 509, user matching computing device 410 may receive the credit information from third party computing platform 440. At step 510, credit rating module 413f may cause user matching computing device 410 to generate a lender credit rating for each of the one or more financial institutions based on the credit information received from third party computing platform 440. In calculating the lender credit rating, user matching computing device 410 may also incorporate credit information received from the one or more supply side computing devices 420A-420n associated with the one or more financial lending institutions. A credit rating may also be calculated with respect to insurance providers. In some instances, however, credit ratings for the one or more financial lending institutions and/or insurance providers may be calculated external to user matching computing device 410 and may not need to be required at user matching computing device 410. In such instances, user matching computing device 410 may receive the credit ratings for the one or more financial lending institutions from third party computing platform 440 and/or other third party computing platforms.

At step 511, one or more of demand side computing devices 430A-430n, associated with one or more users requiring services from the one or more financial lending institutions and/or insurance providers, may access user matching computing device 410. In some instances, the accessing of user matching computing device 410 may occur through a URL associated with the user matching computing device 410. Additionally and/or alternatively, the accessing may occur through an application associated with user matching computing device 410 operating on the one or more of demand side computing devices 430A-430n.

At step 512, demand side UI module 413d may cause user matching computing device 410 to provide a demand side user interface to the one or more of demand side computing devices 430A-430n. In the event that the one or more users requiring services from the one or more financial lending institutions and/or insurance providers associated with the one or more demand side computing devices 430A-430n have not yet created user accounts with user matching computing device 410, demand side UI module 413d may cause user matching computing device 410 to provide a demand side user interface associated with facilitating account creation. Conversely, in the event that the one or more users requiring services from the one or more financial lending institutions and/or insurance providers associated with the one or more demand side computing devices 430A-430n have created user accounts with user matching computing device 410, demand side UI module 413d may cause user matching computing device 410 to provide a demand side user interface associated with facilitating automated user matching.

Referring to FIG. 5D, at step 513, in the event that the one or more users requiring services from the one or more financial lending institutions and/or insurance providers associated with the one or more demand side computing devices 430A-430n have not yet created user accounts with user matching computing device 410, the one or more of demand side computing devices 430A-430n may transmit account information to user matching computing device 410. The account information may be provided by the one or more users requiring services from the one or more financial lending institutions and/or insurance providers and the account information may include information corresponding to the one or more users such as name, address, social security number, account name, password, borrower credit rating, and so on. At step 514, user matching computing device 410 may receive the account information from the one or more of demand side computing devices 430A-430n.

At step 515, user account module 413b may cause user matching computing device 410 to create one or more user accounts corresponding to the one or more users requiring services from the one or more financial lending institutions and/or insurance provides based on the account information received at step 514. The one or more user accounts may be created by user matching computing device 410 in user account database 413a. In creating the one or more user accounts corresponding to the one or more users, user matching computing devices 410 may generate a unique identifier for each of the one or more user accounts.

At step 516, credit rating module 413f may cause user matching computing device 410 to request credit information corresponding to the one or more users requiring services from the one or more financial lending institutions and/or insurance providers from third party computing platform 440. In some instances, credit rating module 413f may also request information corresponding to the one or more users from a plurality of other third party computing platforms. The request may include information associated with the one or more users requiring services from the one or more financial lending institutions including the name, address, and/or social security number. In some instances, additional information may be included.

At step 517, third party computing platform 440 may receive the credit information request from user matching computing device 410. Third party computing platform 440 may query one or more local databases to identify credit information corresponding to the one or more users. In some instances, the credit information identified in the query may be related to the one or more users, but may be associated with one or more auxiliary and/or regulatory organizations tasked with monitoring the credit of the one or more users. At step 518, third party computing platform 440 may provide the credit information identified for the one or more users requiring services from the one or more financial lending institutions to user matching computing device 410.

At step 519, user matching computing device 410 may receive the credit information from third party computing platform 440. At step 520, credit rating module 413f may cause user matching computing device 410 to generate a borrower credit rating for each of the one or more users based on the credit information received from third party computing platform 440. In calculating the borrower credit rating, user matching computing device 410 may also incorporate credit information received from the one or more demand side computing devices 430A-430n associated with the one or more users requiring services from the one or more financial lending institutions. In some instances, credit ratings for the one or more users requiring services from the one or more financial lending institutions and/or insurance providers may be calculated external to user matching computing device 410 and may not be generated at user matching computing device 410. In such instances, user matching computing device 410 may receive the credit ratings for the one or more users from third party computing platform 440 and/or other third party computing platforms.

Referring to FIG. 5F, at step 521, one or more of supply side computing devices 420A-420n may transmit a match request to user matching computing device 410. In some instances, the match request may be transmitted through a user interface produced by user matching computing device 410 through execution of supply side UI module 413c. The match request may include one or more supply side match parameters such as one or more of a lending amount and/or interest rate. In regard to arrangements in which supply side computing devices 420A-420n are associated with insurance providers, the one or more supply side match parameters may include one or more of a coverage amount, deductible, and/or premium.

At step 522, user matching computing device 410 may receive the match request from the one or more of supply side computing devices 420A-420n. User account module 413b may cause user matching computing device 410 to store the user match request and the corresponding one or more supply side match parameters of the one or more supply side computing devices 420A-420n in user account databases 41a.

At step 523, user matching computing device 410 may transmit a network function request to decentralized P2P network 470. The network function request may include the one or more supply side match parameters provided by the one or more supply side computing devices 420A-420n in the match requested transmitted at step 521. In some instances, additional data may be included in the network function request including the lender credit rating. The network function request may be transmitted by user matching computing device 410 through execution and/or usage of one or more data items and/or computer-executable instructions of wallet 413h. In some instances, the network function request may be a data storage operation request and/or a smart contract operation request.

In the event that the network function request is a data storage operation request, the network function request may further include an account identifier associated with the one or more financial lending institutions and/or insurance providers corresponding to the one or more supply side computing devices 420A-420n. In the event that the network function request is a smart contract operation request, the network function request may further include a wallet identifier and/or public key of the smart contract corresponding to the smart contract operation request.

At step 524, decentralized P2P network 470 may receive the network function request from user matching computing device 410 and may broadcast the network function request to each of the full node computing devices decentralized P2P network 470. In some instances, the broadcasting of the network function request may be performed by each of the full node computing devices comprising decentralized P2P network 470 so that each of the full node computing devices receives the network function request.

Referring to FIG. 5G, at step 525, at least one of the full node computing devices of decentralized P2P network 470 may generate a block corresponding to a blockchain (e.g., blockchain 413g) of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which user matching computing device 410 is configured as a full node computing device in decentralized P2P network 470, user matching computing device 410 may, in some instances, generate the block and the block to blockchain 413g of decentralized P2P network 470. The operations of generating and adding the block to blockchain 413g may be similar to those described above in regard to FIG. 2. Additionally and/or alternatively, other operations may be performed by the full node computing devices of decentralized P2P network 470 in generating the block and adding the block to the blockchain.

In the process of generating the block and adding the block to the blockchain, the at least one of the full node computing devices of decentralized P2P network 470 may execute one or more operations corresponding to the network function request transmitted to decentralized P2P network 470 at step 523. For example, in the event that the network function request corresponds to a data storage operation request, the at least one of the full node computing devices of decentralized P2P network 470 may store the data of the data storage operation request (e.g., account identifier, supply side match parameters, lender credit rating, and the like) in the generated block. In some instances, the storage of data in the blockchain may be classified, in part, by the account identifier associated with the one or more financial lending institutions and/or insurance providers.

In the event that the network function request corresponds to a smart contract operation request, the at least of the full node computing devices of decentralized P2P network 470 may associate the one or more supply side match parameters with the smart contract based on the wallet identifier and/or public key of the smart contract. Furthermore, the at least one of the full node computing devices of decentralized P2P network 470 may execute the smart contract, which may comprise the one or more matcher AI algorithms. In the process of generating the block and adding the block comprising the smart contract operation request to the blockchain of decentralized P2P network 470, the at least one of the full node computing devices of decentralized P2P network 470 may identify the block within the blockchain comprising the smart contract, associate the one or more supply side match parameters of the smart contract operation request with the smart contract, and execute the one or more matcher AI algorithms of the smart contract. In this instance, given that the smart contract facilitates the matching of the one or more financial lending institutions and/or insurance providers with one or more users requiring services from the one or more financial lending institutions and/or insurance providers, and that demand side data has yet to be received from demand side computing devices 430A-430n, the at least one of the full node computing devices of decentralized P2P network 470 may execute the smart contract without fulfillment of the matching conditions established by the matcher AI algorithms of the smart contract.

At step 526, the at least one of the full node computing devices of decentralized P2P network 470 may transmit the block to one or more of the other full node computing devices of decentralized P2P network 470. In instances in which user matching computing device 410 is the full node computing device which generated the block, user matching computing device 410 may transmit the generated block to one or more of the other full node computing devices of decentralized P2P network 470.

At step 527, user matching computing device 410 may receive the generated block from one or more of the full node computing devices of the decentralized P2P network 470 and may add the block to blockchain 413g. In doing so, user matching computing device 410 may execute one or more operations corresponding to the network function request transmitted to decentralized P2P network 470 at step 523. In instances in which user matching computing device 410 is the full node computing device which generated the block, step 527 may be omitted.

At step 528, one or more of demand side computing devices 430A-430n may transmit a match request to user matching computing device 410. In some instances, the match request may be transmitted through a user interface produced by user matching computing device 410 through execution of demand side UI module 413d. The match request may include one or more demand side match parameters such as one or more of a desired lending amount and/or desired interest rate. In regard to arrangements in which demand side computing devices 430A-430n are associated with users requiring services from one or more insurance providers, the one or more demand side match parameters may include one or more of a desired coverage amount, desired deductible, and/or desired premium.

Figure 5H:
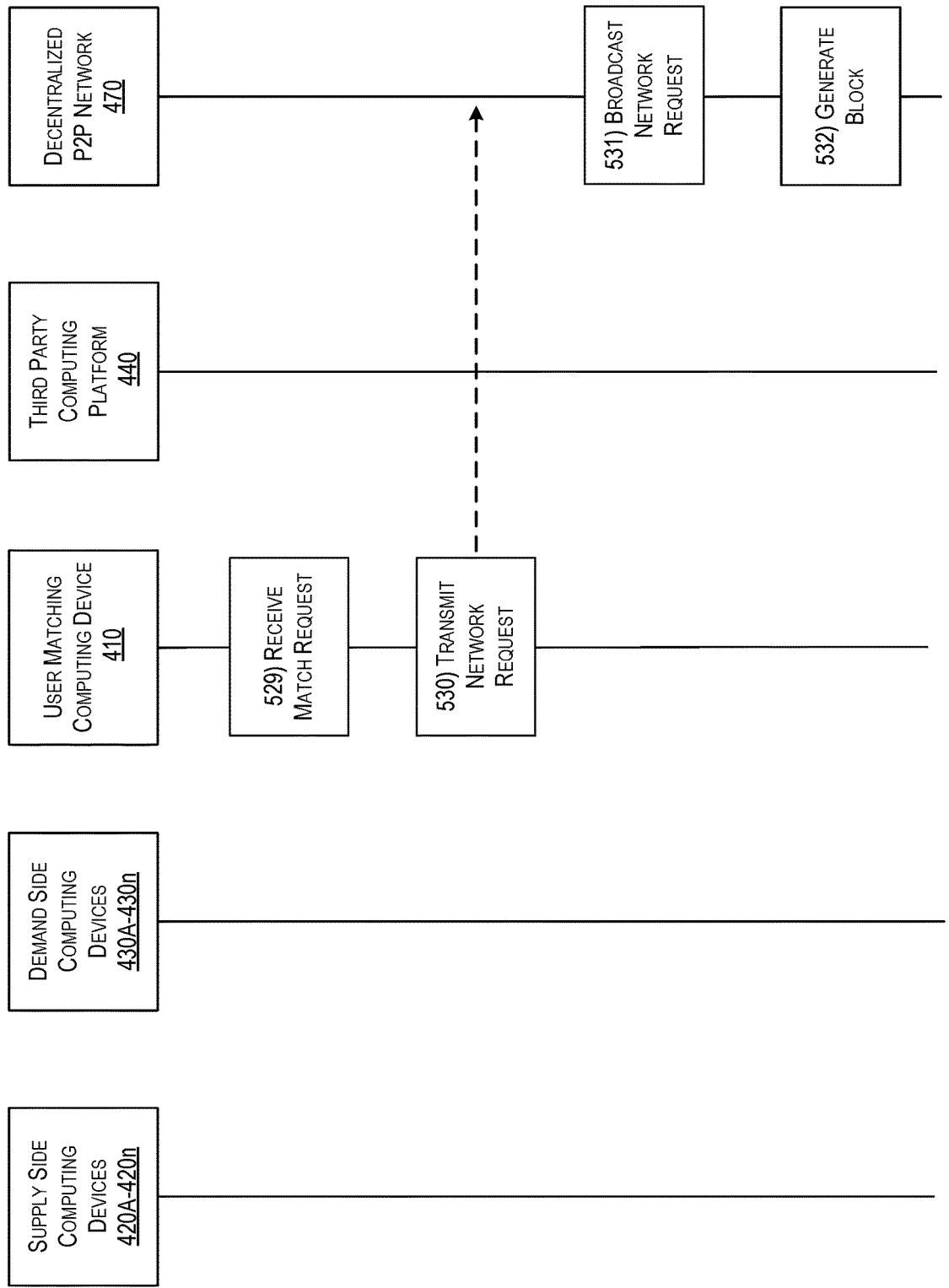

Referring to FIG. 5H, at step 529, user matching computing device 410 may receive the match request from the one or more of demand side computing devices 430A-430n. User account module 413b may cause user matching computing device 410 to store the match request and the corresponding one or more demand side match parameters of the one or more demand side computing devices 430A-430n in user account databases 413a.

At step 530, user matching computing device 410 may transmit a network function request to decentralized P2P network 470. The network function request may include the one or more demand side match parameters provided by the one or more demand side computing devices 430A-430n in the match requested transmitted at step 528. In some instances, the network function request may further include the borrower credit rating. The network function request may be transmitted by user matching computing device 410 through execution and/or usage of one or more data items and/or computer-executable instructions of wallet 413h. In some instances, the network function request may be a data storage operation request and/or a smart contract operation request.

In the event that the network function request is a data storage operation request, the network function request may further include an account identifier associated with the one or more users requiring services of the one or more financial lending institutions and/or insurance providers corresponding to the one or more demand side computing devices 430A-430n along with the one or more demand side match parameters. In the event that the network function request is a smart contract operation request, the network function request may further include a wallet identifier and/or public key of the smart contract corresponding to the smart contract operation request along with the one or more demand side match parameters.

At step 531, decentralized P2P network 470 may receive the network function request from user matching computing device 410 and may broadcast the network function request to each of the full node computing devices decentralized P2P network 470. In some instances, the broadcasting of the network function request may be performed by each of the full node computing devices comprising decentralized P2P network 470 so that each of the full node computing devices receives the network function request.

At step 532, at least one of the full node computing devices of decentralized P2P network 470 may generate a block corresponding to a blockchain (e.g., blockchain 413g) of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which user matching computing device 410 is configured as a full node computing device in decentralized P2P network 470, user matching computing device 410 may, in some instances, generate the block and the block to blockchain 413g of decentralized P2P network 470.

In the process of generating the block and adding the block to the blockchain, the at least one of the full node computing devices of decentralized P2P network 470 may execute one or more operations corresponding to the network function request transmitted to decentralized P2P network 470 at step 530. For example, in the event that the network function request corresponds to a data storage operation request, the at least one of the full node computing devices of decentralized P2P network 470 may store the data of the data storage operation request (e.g., account identifier, demand side match parameters, borrower credit rating, and the like) in the generated block. In some instances, the storage of data in the blockchain may be classified, in part, by the account identifier associated with the one or more users requiring services.

In the event that the network function request corresponds to a smart contract operation request, the at least of the full node computing devices of decentralized P2P network 470 may associate the one or more demand side match parameters with the smart contract based on the wallet identifier and/or public key of the smart contract. Furthermore, the at least one of the full node computing devices of decentralized P2P network 470 may execute the smart contract, which may comprise the one or more matcher AI algorithms. In the process of generating the block and adding the block comprising smart contract operation request to the blockchain of decentralized P2P network 470, the at least one of the full node computing devices of decentralized P2P network 470 may identify the block within the blockchain comprising the smart contract, associate the one or more demand side match parameters of the smart contract operation request with the smart contract, and execute the one or more matcher AI algorithms of the smart contract. In this instance, given that supply side and demand side data have been received from one or more supply side computing devices 420A-420n and one or more demand side computing devices 430A-430n, the at least one of the full node computing devices of decentralized P2P network 470 may execute the smart contract with fulfillment of the necessary data conditions established by the matcher AI algorithms of the smart contract to assess match potential of the supply and demand side data.

In doing so, the one or more matcher AI algorithms of the smart contract may cause at least one of the one or more financial lending institutions and/or insurance providers to be interlinked with at least one of the one or more users requiring services provided by the one or more financial lending institutions and/or insurance providers based on a correlation between the one or more supply side match parameters and demand side match parameters. Furthermore, the smart contract may produce match data which identifies the at least one of the one or more financial lending institutions and/or insurance providers and the least one of the one or more users requiring services provided by the one or more financial lending institutions and/or insurance providers. Such match data may include a match identifier, account identifiers for all matched parties, as well as the demand side match parameters and the supply side match parameters and may be stored as a data output in the blockchain of decentralized P2P network 470 and provided to user matching computing device 410. If the supply and demand side data do not correlate, however, than no match may be yielded during execution of the smart contract.

Referring to FIG. 5I, at step 533, the at least one of the full node computing devices of decentralized P2P network 470 may transmit the block to one or more of the other full node computing devices of decentralized P2P network 470. In instances in which user matching computing device 410 is the full node computing device which generated the block, user matching computing device 410 may transmit the generated block to one or more of the other full node computing devices of decentralized P2P network 470.

At step 534, user matching computing device 410 may receive the generated block from one or more of the full node computing devices of the decentralized P2P network 470 and may add the block to blockchain 413g. In doing so, user matching computing device 410 may execute one or more operations corresponding to the network function request transmitted to decentralized P2P network 470 at step 530. In instances in which user matching computing device 410 is the full node computing device which generated the block, step 534 may be omitted.

At step 535, in the event that the network function request corresponded to a data storage operation request, user matching computing device 410 may execute matcher AI algorithms 413e. In doing so, matcher AI algorithms 413e may interlink at least one of the one or more financial lending institutions and/or insurance providers with at least one of the one or more users requiring services provided by the one or more financial lending institutions and/or insurance providers based on a correlation between the one or more supply side match parameters and demand side match parameters. If the supply and demand side data do not correlate, however, than no match may be yielded during execution of the smart contract.

At step 536, user matching computing device 410 may generate a match between at least one of the one or more financial lending institutions and/or insurance providers with at least one of the one or more users requiring services provided by the one or more financial lending institutions and/or insurance providers. The match may produce match data which identifies the at least one of the one or more financial lending institutions and/or insurance providers and the least one of the one or more users requiring services provided by the one or more financial lending institutions and/or insurance providers. Such match data may include a match identifier, account identifiers for all matched parties, as well as the demand side match parameters and the supply side match parameters. Such data may be stored in user account database 413a in relation to the account information of the at least one or more financial lending institutions and/or insurance providers and the least one of the one or more users.

Referring to FIG. 5J, at step 537, user matching computing device 410 may notify each of the at least one of the one or more financial lending institutions and/or insurance providers and the least one of the one or more users of the match. The notification may further include the match data. In some instances, the notification of the match provided by user matching computing device 410 may be occur if the match was generated at user matching computing device 410 and/or through smart contract execution through decentralized P2P network 470.

At step 538, at least one of supply side computing devices 420A-420n and at least one of demand computing devices 430A-430n corresponding to the at least one of the one or more matched financial lending institutions and/or insurance providers and the least one of the one or more matched users may transmit a match confirmation to user matching computing device 410. The match confirmation may include at least an acceptance of the match and an agreement to the match parameters. At step 539, user matching computing device 410 may receive the match confirmation from the at least one of supply side computing devices 420A-420n and the at least one of demand computing devices 430A-430n. User account module 413b may cause user matching computing device 410 to store the match confirmation of at least one of supply side computing devices 420A-420n and the at least one of demand computing devices 430A-430n in user account databases 413a.

At step 540, user matching computing device 410 may transmit a network function request to decentralized P2P network 470. In the event that the matching was performed off-chain at user matching computing device 410, the network function request may be a data storage request and may include the match data and the match confirmation. In the event that the matching was performed on-chain through the decentralized P2P network 470, the network function request may be a data storage request and may include the match confirmation.

Figure 5K:
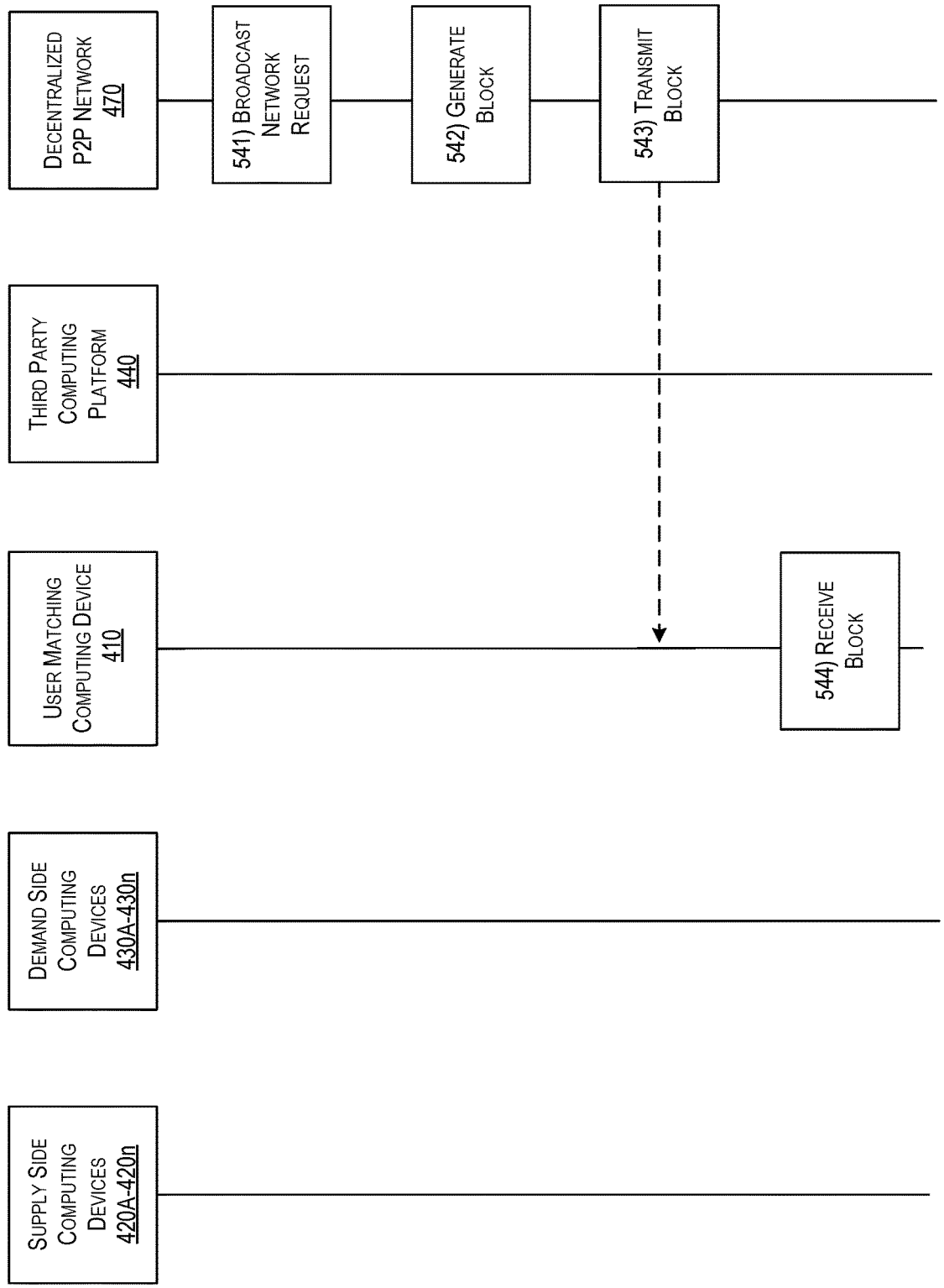

Referring to FIG. 5K, at step 541, decentralized P2P network 470 may receive the network function request from user matching computing device 410 and may broadcast the network function request to each of the full node computing devices decentralized P2P network 470. In some instances, the broadcasting of the network function request may be performed by each of the full node computing devices comprising decentralized P2P network 470 so that each of the full node computing devices receives the network function request.

At step 542, at least one of the full node computing devices of decentralized P2P network 470 may generate a block corresponding to the blockchain of decentralized P2P network 470 and may add the block to the blockchain. In particular, at least one of the full node computing devices comprising decentralized P2P network 470 may perform one or more operations of decentralized P2P network 470 in generating the block and adding the block to the blockchain of decentralized P2P network 470. In arrangements in which user matching computing device 410 is configured as a full node computing device in decentralized P2P network 470, user matching computing device 410 may, in some instances, generate the block and the block to blockchain 413g of decentralized P2P network 470.

In the process of generating the block and adding the block to the blockchain, the at least one of the full node computing devices of decentralized P2P network 470 may execute one or more operations corresponding to the network function request transmitted to decentralized P2P network 470 at step 530. For example, the at least one of the full node computing devices of decentralized P2P network 470 may store the data of the data storage operation request in the generated block. In some instances, the block may be provided to all full node computing devices in decentralized P2P network 470.

At step 543, the at least one of the full node computing devices of decentralized P2P network 470 may transmit the block to one or more of the other full node computing devices of decentralized P2P network 470. In instances in which user matching computing device 410 is the full node computing device which generated the block, user matching computing device 410 may transmit the generated block to one or more of the other full node computing devices of decentralized P2P network 470.

At step 544, user matching computing device 410 may receive the generated block from one or more of the full node computing devices of the decentralized P2P network 470 and may add the block to blockchain 413g. In doing so, user matching computing device 410 may execute one or more operations corresponding to the network function request transmitted to decentralized P2P network 470 at step 530. In instances in which user matching computing device 410 is the full node computing device which generated the block, step 534 may be omitted.

Referring to FIG. 5L, at step 545, at least one of supply side computing devices 420A-420n corresponding to the at least one of the one or more financial lending institutions and/or insurance providers of the match may provide an update to the match. In some instances, the update to the match may be provided at a regular interval corresponding to the terms of the match and may include an indication of whether or not the agreed upon match parameters are being fulfilled by the at least one matched user. In some instances, at least one of demand side computing devices 430A-430n corresponding to the at least one matched user may provide an update to the match.

At step 546, user matching computing device 410 may receive the update to the match. At step 547, credit rating module 413e may cause user matching computing device 410 to update a lender credit rating for each of the one or more matched financial institutions based on the updated match data. An updated credit rating may also be generated with respect to one or more matched insurance providers. Furthermore, credit rating module 413f may also cause user matching computing device 410 to generate a borrower credit rating for each of the one or more matched users based on the updated match data. Such data may be stored by user matching computing device 410 in user account database 413a. At step 548, user matching computing device 410 may transmit a network function request to decentralized P2P network 470. The network function request may be a data storage request and may include the updated lender and/or borrower credit ratings and the updated match data. The network function request may be processed in the manner described herein.

In instances in which execution of a smart contract created a match between one or more insurance providers and one or more users requiring services provided by the insurance providers, the smart contract may further control insurance claim management and claim payment to the one or more users in the event of an accident.

Figure 6:
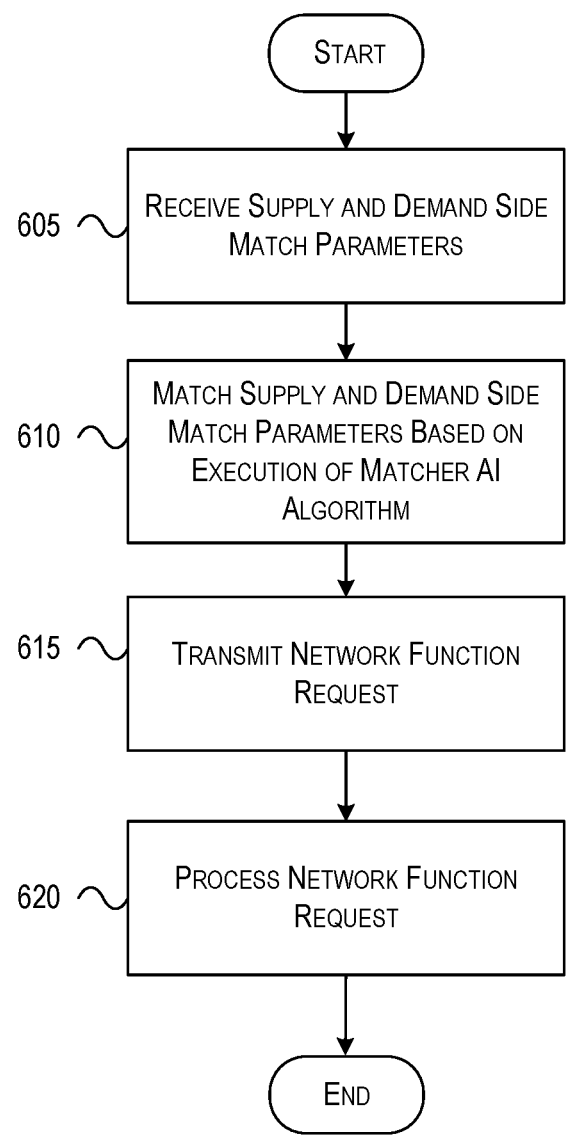
FIG. 6 depicts an illustrative method for blockchain-based automated user matching in accordance with one or more example embodiments described herein.

FIG. 6 depicts an illustrative method for blockchain-based automated user matching in accordance with one or more example embodiments described herein. Referring to FIG. 6, at step 605, a computing device configured to operate in a P2P network and including at least one or more processors and memory storing at least a portion of a blockchain of the P2P network may receive supply side match parameters from one or more supply side customers, through a supply side user interface associated with the computing device, and demand side match parameters from one or more demand side customers, through a demand side user interface associated with the computing device. At step 610, the computing device may match the supply side match parameters with the demand side match parameters based on execution of a matcher artificial intelligence algorithm, wherein the execution of the matcher artificial intelligence algorithm produces match data related to the supply side match parameters and the demand side match parameters. At step 615, the computing device may transmit a network function request including the match data to the P2P network. At step 620, the computing device may process the network function request to add a block to the blockchain, wherein the block comprises the match data.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method, comprising:
   at a computing device configured to operate in a peer-to-peer (P2P) network, the computing device including at least one or more processors and memory storing at least a blockchain of the (P2P) network:
   receiving supply side match parameters from one or more supply side customers, through a supply side user interface associated with the computing device;
   receiving demand side match parameters from one or more demand side customers, through a demand side user interface associated with the computing device;
   matching the supply side match parameters with the demand side match parameters based on execution of a matcher artificial intelligence algorithm, wherein the execution of the matcher artificial intelligence algorithm produces match data related to the supply side match parameters and the demand side match parameters;
   transmitting a network function request including the match data to the P2P network; and
   processing the network function request to add a block to the blockchain, wherein the block comprises the match data.

2. The method of claim 1, wherein the supply side match parameters include first supply side match parameters from a first supply side customer, wherein the demand side match parameters include first demand side match parameters from a first demand side customer, and wherein the execution of the matcher artificial intelligence algorithm produces first match data relating the first supply side customer with the first demand side customer.

3. The method of claim 1, wherein the supply side match parameters include first supply side match parameters from a first supply side customer and second supply side match parameters from a second supply side customer, wherein the demand side match parameters include first demand side match parameters from a first demand side customer, and wherein the execution of the matcher artificial intelligence algorithm produces first match data relating the first supply side customer and the second supply side customer with the first demand side customer.

4. The method of claim 1, wherein the supply side match parameters include first supply side match parameters from a first supply side customer, wherein the demand side match parameters include first demand side match parameters from a first demand side customer and second supply side match parameters from a second demand side customer, and wherein the execution of the matcher artificial intelligence algorithm produces first match data relating the first supply side customer with the first demand side customer and the second demand side customer.

5. The method of claim 1, further comprising:
   responsive to matching the supply side match parameters with the demand side match parameters, transmitting a match notification to one or more computing devices corresponding to one or more supply side customers associated with the supply side match parameters and one or more computing devices corresponding to one or more demand side customers associated with the demand side match parameters;
   receiving confirmations from each of the one or more computing devices corresponding to the one or more supply side customers associated with the supply side match parameters and each of the one or more computing devices corresponding to the one or more demand side customers associated with the demand side match parameters; and
   based on the confirmations, transmitting the network function request including the match data to the P2P network.

6. The method of claim 1, further comprising:
   prior to receiving the supply side match parameters from the one or more supply side customers and the demand side match parameters from the one or more demand side customers, generating user accounts for each of the one or more supply side customers and the one or more demand side customers; and
   retrieving, from one or more third party computing devices, credit related data for each of the one or more demand side customers based on the generated user accounts for each of the one or more demand side customers, and
   wherein the matching of the supply side match parameters with the demand side match parameters based on execution of the matcher artificial intelligence algorithm incorporates the credit related data.

7. The method of claim 1, further comprising:
   generating credit scores associated with each of the one or more demand side customers, wherein the network function request includes each of the credit scores;
   receiving an update to the match data from at least one of the one or more supply side customers and the one or more demand side customers;
   updating each of the credit scores based on the update to the match data; and
   transmitting another network function request including at least the update to match data and each of the updated credit scores.

8. A computing device configured to operate in a peer-to-peer (P2P) network, comprising:
   one or more processors; and memory storing at least a blockchain of the P2P network and computer-readable instructions that, when executed by the one or more processors, cause the computing device to:
- receive supply side match parameters from one or more supply side customers through a supply side user interface associated with the computing device;
- receive demand side match parameters from one or more demand side customers, through a demand side user interface associated with the computing device;
- match the supply side match parameters with the demand side match parameters based on execution of a matcher artificial intelligence algorithm, wherein the execution of the matcher artificial intelligence algorithm produces match data related to the supply side match parameters and the demand side match parameters;
- transmit a network function request including the match data to the P2P network; and
- process the network function request to add a block to the blockchain, wherein the block comprises the match data.

9. The computing device of claim 8, wherein the supply side match parameters include first supply side match parameters from a first supply side customer, wherein the demand side match parameters include first demand side match parameters from a first demand side customer, and wherein the execution of the matcher artificial intelligence algorithm produces first match data relating the first supply side customer with the first demand side customer.

10. The computing device of claim 8, wherein the supply side match parameters include first supply side match parameters from a first supply side customer and second supply side match parameters from a second supply side customer, wherein the demand side match parameters include first demand side match parameters from a first demand side customer, and wherein the execution of the matcher artificial intelligence algorithm produces first match data relating the first supply side customer and the second supply side customer with the first demand side customer.

11. The computing device of claim 8, wherein the supply side match parameters include first supply side match parameters from a first supply side customer, wherein the demand side match parameters include first demand side match parameters from a first demand side customer and second supply side match parameters from a second demand side customer, and wherein the execution of the matcher artificial intelligence algorithm produces first match data relating the first supply side customer with the first demand side customer and the second demand side customer.

12. The computing device of claim 8, wherein the memory stores further computer-readable instructions that, when executed by the one or more processors, cause the computing device to:
- responsive to matching the supply side match parameters with the demand side match parameters, transmit a match notification to one or more computing devices corresponding to one or more supply side customers associated with the supply side match parameters and one or more computing devices corresponding to one or more demand side customers associated with the demand side match parameters;
- receive confirmations from each of the one or more computing devices corresponding to the one or more supply side customers associated with the supply side match parameters and each of the one or more computing devices corresponding to the one or more demand side customers associated with the demand side match parameters; and
- based on the confirmations, transmit the network function request including the match data to the P2P network.

13. The computing device of claim 8, wherein the memory stores further computer-readable instructions that, when executed by the one or more processors, cause the computing device to:
- prior to receiving the supply side match parameters from the one or more supply side customers and the demand side match parameters from the one or more demand side customers, generate user accounts for each of the one or more supply side customers and the one or more demand side customers; and
- retrieve, from one or more third party computing devices, risk related data for each of the one or more demand side customers based on the generated user accounts for each of the one or more demand side customers, and
- wherein the matching of the supply side match parameters with the demand side match parameters based on execution of the matcher artificial intelligence algorithm incorporates the risk related data.

14. The computing device of claim 8, wherein the memory stores further computer-readable instructions that, when executed by the one or more processors, cause the computing device to:
- generate credit scores associated with each of the one or more demand side customers, wherein the network function request includes each of the credit scores;
- receive an update to the match data from at least one of the one or more supply side customers and the one or more demand side customers;
- update each of the credit scores based on the update to the match data; and
- transmit another network function request including at least the update to match data and each of the updated credit scores.

15. One or more non-transitory computer-readable media storing instructions that, when executed by a computing device configured to operate in a peer-to-peer (P2P) network, the computing device including at least one or more processors and memory storing at least a blockchain of the (P2P) network, cause the computing device to:
- receive supply side match parameters from one or more supply side customers through a supply side user interface associated with the computing device;
- receive demand side match parameters from one or more demand side customers, through a demand side user interface associated with the computing device;
- match the supply side match parameters with the demand side match parameters based on execution of a matcher artificial intelligence algorithm, wherein the execution of the matcher artificial intelligence algorithm produces match data related to the supply side match parameters and the demand side match parameters;
- transmit a network function request including the match data to the P2P network; and
- process the network function request to add a block to the blockchain, wherein the block comprises the match data.

16. The one or more non-transitory computer-readable media of claim 15, wherein the supply side match parameters include first supply side match parameters from a first supply side customer and second supply side match parameters from a second supply side customer, wherein the demand side match parameters include first demand side match parameters from a first demand side customer, and wherein the execution of the matcher artificial intelligence algorithm produces first match data relating the first supply side customer and the second supply side customer with the first demand side customer.

17. The one or more non-transitory computer-readable media of claim 15, wherein the supply side match parameters include first supply side match parameters from a first supply side customer, wherein the demand side match parameters include first demand side match parameters from a first demand side customer and second supply side match parameters from a second demand side customer, and wherein the execution of the matcher artificial intelligence algorithm produces first match data relating the first supply side customer with the first demand side customer and the second demand side customer.

18. The one or more non-transitory computer-readable media of claim 15, storing additional instructions that, when executed by the computing device, cause the computing device to:
responsive to matching the supply side match parameters with the demand side match parameters, transmit a match notification to one or more computing devices corresponding to one or more supply side customers associated with the supply side match parameters and one or more computing devices corresponding to one or more demand side customers associated with the demand side match parameters;
receive confirmations from each of the one or more computing devices corresponding to the one or more supply side customers associated with the supply side match parameters and each of the one or more computing devices corresponding to the one or more demand side customers associated with the demand side match parameters; and
based on the confirmations, transmit the network function request including the match data to the P2P network.

19. The one or more non-transitory computer-readable media of claim 15, storing additional instructions that, when executed by the computing device, cause the computing device to:
prior to receiving the supply side match parameters from the one or more supply side customers and the demand side match parameters from the one or more demand side customers, generate user accounts for each of the one or more supply side customers and the one or more demand side customers; and
retrieve, from one or more third party computing devices, risk related data for each of the one or more demand side customers based on the generated user accounts for each of the one or more demand side customers, and
wherein the matching of the supply side match parameters with the demand side match parameters based on execution of the matcher artificial intelligence algorithm incorporates the risk related data.

20. The one or more non-transitory computer-readable media of claim 15, storing additional instructions that, when executed by the computing device, cause the computing device to:
generate credit scores associated with each of the one or more demand side customers, wherein the network function request includes each of the credit scores;
receive an update to the match data from at least one of the one or more supply side customers and the one or more demand side customers;
update each of the credit scores based on the update to the match data; and
transmit another network function request including at least the update to match data and each of the updated credit scores.

* * * * *